United States Patent
Vasanad et al.

(10) Patent No.: US 12,547,471 B2
(45) Date of Patent: Feb. 10, 2026

(54) TECHNIQUES FOR MANAGING EDGE DEVICE PROVISIONING

(71) Applicant: Oracle International Corporation, Redwood Shores, CA (US)

(72) Inventors: Naren Shivashankar Vasanad, Fremont, CA (US); Alok Shankar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/620,736

(22) Filed: Mar. 28, 2024

(65) Prior Publication Data

US 2024/0241766 A1    Jul. 18, 2024

Related U.S. Application Data

(63) Continuation of application No. 17/871,766, filed on Jul. 22, 2022, now Pat. No. 11,972,300.

(51) Int. Cl.
| | |
|---|---|
| G06F 9/50 | (2006.01) |
| H04L 9/08 | (2006.01) |
| H04L 9/32 | (2006.01) |

(52) U.S. Cl.
CPC .......... *G06F 9/5072* (2013.01); *H04L 9/0825* (2013.01); *H04L 9/3213* (2013.01); *G06F 2209/505* (2013.01)

(58) Field of Classification Search
CPC ............................ H04L 9/0825; H04L 9/3213
See application file for complete search history.

(56) References Cited

U.S. PATENT DOCUMENTS

| | | |
|---|---|---|
| 8,301,720 B1 | 10/2012 | Thakker et al. |
| 10,656,865 B1 | 5/2020 | Janse van Rensburg et al. |

(Continued)

FOREIGN PATENT DOCUMENTS

| | | |
|---|---|---|
| EP | 2369782 A1 | 9/2011 |
| EP | 3391588 A1 | 10/2018 |

(Continued)

OTHER PUBLICATIONS

AWS Snowball Edge Developer Guide: AWS Snowball Edge, Available Online at: https://docs.aws.amazon.com/snowball/latest/developer-guide/AWSSnowball-dg.pdf#UsingCluster, 2021, 227 pages.

(Continued)

*Primary Examiner* — Nicholas P Celani
(74) *Attorney, Agent, or Firm* — Kilpatrick Townsend & Stockton LLP

(57) ABSTRACT

Techniques discussed herein relate to managing aspects of provisioning cloud-computing edge devices. In some embodiments, a user request specifying one or more resources to be provisioned at a cloud-computing edge device may be received by a cloud-computing device operated by a cloud-computing provider. An ephemeral credential may be generated for the edge device and used to determine whether access control policies exist that enable the edge device to access the resource(s). If the resource(s) are accessible, a manifest may be generated in accordance with the user request. The manifest may specify a configuration for the cloud-computing edge device and includes information related to the resource. Operations may be subsequently executed to provision the cloud-computing edge device in accordance with the manifest. However, if the resource(s) are not accessible, the user request may be denied.

18 Claims, 14 Drawing Sheets

(56) References Cited

U.S. PATENT DOCUMENTS

| | | |
|---|---|---|
| 10,785,211 B2 | 9/2020 | Zhu et al. |
| 10,911,558 B1 | 2/2021 | Witzel |
| 10,991,558 B2 | 4/2021 | Bern et al. |
| 11,044,118 B1 | 6/2021 | Reed et al. |
| 11,188,376 B1 | 11/2021 | Alexander et al. |
| 11,191,013 B1 | 11/2021 | Kalkunte et al. |
| 11,281,857 B1 | 3/2022 | Craft et al. |
| 11,349,710 B1 | 5/2022 | Nelson et al. |
| 11,848,817 B2 | 12/2023 | Nelson et al. |
| 2004/0252717 A1 | 12/2004 | Solomon et al. |
| 2010/0228919 A1 | 9/2010 | Stabrawa et al. |
| 2012/0066680 A1 | 3/2012 | Amano et al. |
| 2018/0054354 A1 | 2/2018 | Wienstroer et al. |
| 2018/0069804 A1 | 3/2018 | Laplanche et al. |
| 2019/0138294 A1 | 5/2019 | Smith et al. |
| 2019/0253262 A1* | 8/2019 | Smith .................. H04W 12/08 |
| 2019/0347121 A1 | 11/2019 | Luo et al. |
| 2020/0007414 A1 | 1/2020 | Smith et al. |
| 2020/0026524 A1 | 1/2020 | Roland et al. |
| 2020/0097274 A1 | 3/2020 | Sarkar et al. |
| 2020/0213227 A1 | 7/2020 | Pianigiani et al. |
| 2020/0293347 A1 | 9/2020 | Buckley |
| 2020/0351323 A1 | 11/2020 | Gong et al. |
| 2021/0112034 A1 | 4/2021 | Sundararajan et al. |
| 2021/0117134 A1 | 4/2021 | Keys et al. |
| 2021/0314365 A1 | 10/2021 | Smith et al. |
| 2022/0083245 A1* | 3/2022 | Kant .................... G06F 3/0632 |
| 2022/0334725 A1 | 10/2022 | Mertes et al. |

FOREIGN PATENT DOCUMENTS

| | | |
|---|---|---|
| WO | 2016069638 A2 | 5/2016 |
| WO | 2019236181 A1 | 12/2019 |
| WO | 2020052322 A1 | 3/2020 |

OTHER PUBLICATIONS

Cisco SD-WAN Design Guide, Available Online at: https://www.cisco.com/c/en/us/td/docs/solutions/CVD/SDWAN/cisco-sdwan-design-guide.html, Sep. 2020, 102 pages.

Device Update APT Manifest, Available Online at: https://docs.microsoft.com/en-us/azure/iot-hub-device-update/device-update-apt-manifest, Feb. 17, 2021, 2 pages.

Edge Computing, Wikipedia, Available online at: https://web.archive.org/web/20210112031346/https://en.wikipedia.org/wiki/Edge_computing, Jan. 12, 2021, pp. 1-6.

Encrypting Traffic Between Nodes with IPsec, Available Online at: https://docs.openshift.com/container-platform/3.11/admin_guide/ipsec.html, Accessed from Internet on May 21, 2021, 8 pages.

NSX-T Data Center Installation Guide, Available Online at: https://docs.vmware.com/en/VMware-NSX-T-Data-Center/2.5/nsxt_25_install.pdf, Jul. 31, 2020, 276 pages.

NSX-T Data Center Upgrade Guide, Available Online at: https://docs.vmware.com/en/VMware-NSX-T-Data-Center/3.1/nsxt_31_upgrade.pdf, Oct. 22, 2021, pp. 1-58.

Software Installation and Upgrade for vEdge Routers, Available Online at: https://www.cisco.com/c/en/us/td/docs/routers/sdwan/configuration/sdwan-xe-gs-book/hardware-and-software-installation.html, 2021, 2 pages.

Upgrade an Edge Cluster, Available Online at: https://partners-intl.aliyun.com/help/doc-detail/154532.htm, Mar. 5, 2021, 4 pages.

U.S. Appl. No. 17/531,632, Notice of Allowance mailed on Apr. 15, 2022, 18 pages.

U.S. Appl. No. 17/589,360, Non-Final Office Action mailed on Mar. 21, 2023, 13 pages.

U.S. Appl. No. 17/589,360, Notice of Allowance mailed on Aug. 9, 2023, 14 pages.

U.S. Appl. No. 17/733,602, Notice of Allowance mailed on Nov. 25, 2022, 17 pages.

U.S. Appl. No. 17/871,766, Final Office Action mailed on Nov. 7, 2023, 14 pages.

U.S. Appl. No. 17/871,766, Non-Final Office Action mailed on Jun. 14, 2023, 13 pages.

U.S. Appl. No. 17/871,766, Notice of Allowance mailed on Feb. 12, 2024, 9 pages.

Akesson, How to Build a Resilient Over-the-Air Update Solution, Available Online at: https://techcommunity.microsoft.com/t5/internet-of-things/how-to-build-a-resilient-over-the-air-update-solution/ba-p/2163991, Mar. 2, 2021, 4 pages.

Asif et al., Prototype Implementation of Edge Encryption in IoT Architecture, 10th International Conference on Computing, Communication and Networking Technologies, Jul. 6-8, 2019, 7 pages.

PAVLIK, Managing Thousands of Edge Kubernetes Clusters with GitOps, Available Online at: https://www.volterra.io/resources/blog/managing-thousands-of-edge-kubernetes-clusters-with-gitops, Dec. 18, 2019, 11 pages.

International Application No. PCT/US2022/023549, International Preliminary Report on Patentability mailed on Oct. 19, 2023, 9 pages.

International Application No. PCT/US2022/023549, International Search Report and Written Opinion mailed on Jun. 22, 2022, 12 pages.

Villari et al., Deployment Orchestration of Microservices with Geographical Constraints for Edge Computing, 2017 IEEE Symposium On Computers And Communications, Jul. 3, 2017, pp. 1-6.

Mllari et al., Osmotic Computing: A New Paradigm for Edge/Cloud Integration, IEEE Cloud Computing, vol. 3, No. 6, Dec. 30, 2016, pp. 76-83.

\* cited by examiner

TECHNIQUES FOR MANAGING EDGE DEVICE PROVISIONING

CROSS-REFERENCE TO RELATED APPLICATION

This application is a continuation of U.S. Non-Provisional patent application Ser. No. 17/871,766, filed Jul. 22, 2022, the content of which is hereby incorporated by reference in its entirety for all purposes.

BACKGROUND

In cloud computing, processing and storage is generally performed by one or more service providers implemented at a centralized location. Data can be received from customers at the centralized location, processed there, and then the processed (or other) data can be transmitted back to customers. However, having a centralized location for cloud infrastructure components may not be ideal in various scenarios. For example, when there are hundreds or thousands of Internet of Things (IoT) devices transmitting data to the central servers, and especially when those IoT devices are not geographically close to the cloud infrastructure computing devices, conventional centralized systems are not ideal. These IoT devices may be considered on the "edge," as in they are not close to the central servers.

Additionally, there may be other instances when the centralized location for cloud components is less than ideal. For example, if the data is collected (e.g., by IoT devices) in a disconnected region or a location with no Internet connectivity (e.g., remote locations). Current centralized cloud computing environments may not meet time sensitivity requirements when streaming data due to the inherent latency of their wide-area network connections. Remotely generated data may need to be processed more quickly (e.g., to detect anomalies) than conventional centralized cloud computing systems allow. Thus, there are challenges with managing a traditional cloud computing environment that relies on centralized components. For example, a centralized workflow manager may be suboptimal for managing workflows at geographically remote devices.

In light of these considerations, it may be desirable to provision a device to operate at a remote location separate from the centralized cloud computing environment. The resources (e.g., object storage buckets, virtual machine images, etc.) provisioned on this device may enable its operation. At least some of those resources that may be obtainable from a user's cloud-computing tenancy within the centralized cloud computing environment. Conventional techniques for enabling access to these resources are error prone and may lead to unnecessary delay in the provisioning process.

BRIEF SUMMARY

Techniques are provided (e.g., a method, a system, non-transitory computer-readable medium storing code or instructions executable by one or more processors) for managing a provisioning process of a cloud-infrastructure edge computing device (e.g., a computing device configured to deliver computing and storage at remote locations separate from the centralized data center and lacking a public/private network connection, also referred to herein as an "edge device," for brevity).

One embodiment is directed to a method. The method may comprise receiving, by a computing device operated by a cloud computing provider, a request specifying a centralized cloud-computing resource to be provisioned at a cloud-computing edge device. In some embodiments, the cloud-computing edge device may be configured to selectively execute within an isolated computing environment separate from a centralized cloud computing environment. The cloud-computing edge device may have no access to a public network while executing within the isolated computing environment. The method may further comprise generating an ephemeral credential corresponding to the cloud-computing edge device. The method may further comprise determining, based at least in part on the ephemeral credential, that the centralized cloud-computing resource to be provisioned at the cloud-computing edge device is accessible to the cloud-computing edge device. The method may further comprise generating, based at least in part on the request, a manifest that specifies configuration data for the cloud-computing edge device. In some embodiments, generating the manifest may be based at least in part on determining that the centralized cloud-computing resource is accessible to the cloud-computing edge device. The configuration data of the manifest may identify the centralized cloud-computing resource. The method may further comprise executing, based at least in part on generating the manifest, operations to cause the cloud-computing edge device to be provisioned with the centralized cloud-computing resource in accordance with the manifest.

In some embodiments, a computing device is disclosed. The computing device may be configured with one or more processors and one or more memories configured with executable instructions that, when executed by the one or more processors, cause the computing device to perform the method disclosed in the paragraph above.

Some embodiments disclose a non-transitory computer-readable storage medium comprising computer-executable instructions that, when executed with one or more processors of a computing device, cause the computing device to perform the methods disclosed herein.

DETAILED DESCRIPTION

Figure 1:
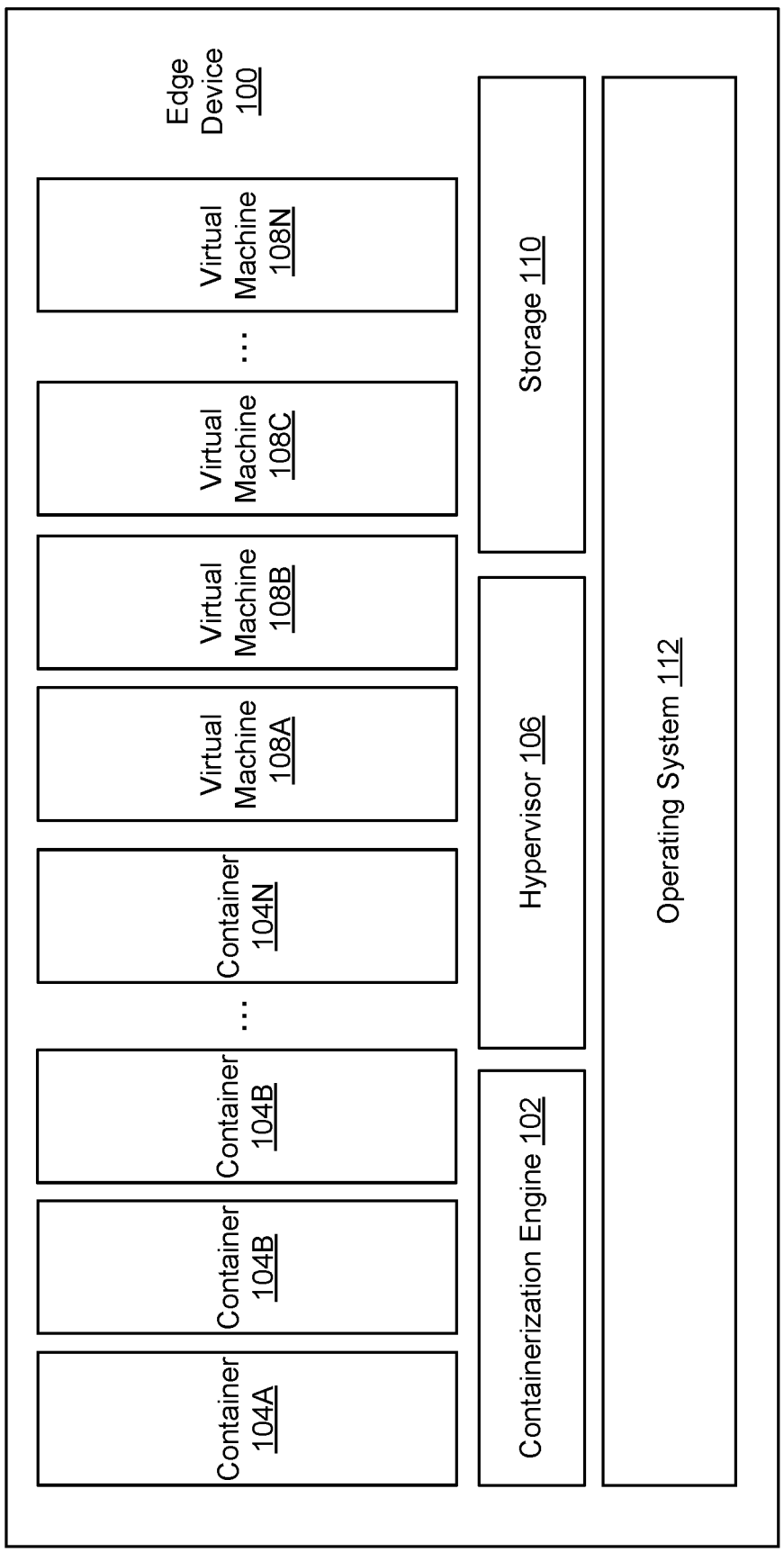
FIG. 1 is a block diagram of an example high-level architecture for a cloud infrastructure edge computing device, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In some examples, a cloud-integrated edge service (e.g., implemented in a cloud-infrastructure edge computing device, also referred to as an "edge device," for brevity) may be integral in addressing the desire to run time-sensitive cloud infrastructure application outside of a centralized data center (e.g., a datacenter of a cloud infrastructure service provider). Such an edge device may deliver computing and storage at the edge and/or in disconnected locations (e.g., remote locations separate from the centralized data center and lacking a public/private network connection (e.g., an Internet connection, a VPN connection, a dedicated connection, etc.) to enable low-latency processing at or near the point of data generation and ingestion. In some instances, a fleet of portable (which may be ruggedized for protection) server nodes (e.g., a fleet of edge devices) may be configured to physically bring the cloud infrastructure service to remote locations where cloud technology has been considered technologically infeasible or too cost prohibitive to implement.

To a customer (e.g., a user), the edge device can act as an extension of their cloud infrastructure: including virtual machines (VMs), containers, functions and data files, block volumes or object store services can also be delivered from the cloud infrastructure tenancy (e.g., a tenancy of the centralized cloud computing environment) with little to no modifications, and the user experience may remain unchanged from that of the centralized cloud computing experience. Additionally, the edge device may be configured to implement both a control plane and a data plane that are part of a cloud infrastructure service provider. The data plane can be configured to manage data storage, migration, processing, etc., while the control plan can be configured for controlling the various services and architecture components of the computing device. Once the edge computing device is properly connected to a customer computing device (e.g., via a local area network (LAN)), the customer may be able to utilize the IaaS service (or at least a subset of it) using the same SDK and API used with the centralized cloud service.

The edge computing device can be delivered to a customer in a pre-configured form, such that the only action that might be required of the customer is to connect the nodes to a network (e.g., a local/on premise network that is accessible by a user computing device), power them up, and/or log in. The device can be pre-configured in various ways based on customer preference/request, or it can be in one of various configurations (e.g., storage-centric, compute-centric, etc.). The node or cluster of nodes can be portable and is intended to be mobile—when moved and set up again (or used while in motion), the deployment continues to run from where it turned off (or continuously). The edge computing device can also monitor for wide area network (WAN) connection availability (e.g., the Internet or the like), and can synchronize customer and management data with the cloud once connected to a WAN.

Some potential use cases for the edge computing device include: storage and processing, compute and input/output (I/O) intensive applications, machine learning, remote computing, low latency database and analytics, and data collection and migration. More specifically, the edge device can be used for storage and processing of large volumes of images, video, audio, and IoT sensor data generated in environments where WAN connection is latent or unavailable (e.g., in remote areas, an oil off-shore platform, or the like). Once this data is pre-processed, filtered, compressed, and/or secured it may be transported or transferred to the cloud service provider, where it can be further processed by the centralized server (e.g., traditional cloud service provider). The device can also be used for compute and I/O intensive applications, where low latency is paramount, such as tactical reconnaissance or 5G communications. The device can also be used for machine learning, with models trained in the cloud and running in disconnected locations to improve efficiency, intelligence, and/or productivity in manufacturing, document management, transportation, oil and gas mining, and/or telecommunications. It can also be used for remote computing requiring elevated security and airtight containment of data. Additionally, the device can be used for low latency database and analytics workloads, with more applications optimized over time. Further, the device can also be used for data collection and migration of large sets of object and database management system (DBMS) data into a cloud service provider, e.g., at faster speeds and lower cost than a WAN transfer.

The edge device can natively support distributed cloud paradigms, where complex, multi-stage compute workflows can be separated into individual components, which in turn can be deployed to the infrastructure of the edge device, on premise, and/or in the cloud. An example of such distributed workflow is represented in the following scenario. Massive amounts of data can be collected by an edge computing node deployed on an airplane (e.g., a military jet) in a reconnaissance operation with no Internet access (e.g., a disconnected edge computing device), where this data is be pre-processed in near real time by a machine learning model previously trained by the cloud service provider that provided the edge device. Even the first pass of processing the data with the models can detect significant anomalies and can alert personnel immediately—for example, a bridge may be destroyed and therefore the troops should be rerouted. When the airplane lands, the edge computing device can be physically connected to a network (e.g., an edge station potentially deployed at the airstrip). The pre-processed, filtered, smaller dataset can be loaded for final processing to a cluster of edge computing device nodes at the edge station. The original edge computing device can be released and can be loaded on another (or the same) airplane, for example to support the next mission. When processing at the edge station is complete, a 3D map update can be issued for immediate use. Change sets can then be uploaded by the edge station cluster to a datacenter and can be used to build future models providing intelligent tactical forecasts to the reconnaissance operation, or the like.

It should be appreciated that the following techniques may be employed in a variety of contexts such as telecommunications, oil and gas, healthcare, hospitality, agriculture, transportation, and logistics, and the like.

Embodiments described herein address these and other problems, individually and collectively. Specifically, embodiments of the present disclosure provide for a cloud infrastructure edge computing device.

Edge Device Architecture

An edge computing device (sometimes referred to as "a cloud-computing edge device," a "cloud infrastructure edge computing device," or an "edge device," for brevity), extends a user's centralized cloud computing tenancy by physically putting customer infrastructure and platform services where data is generated—on the edge, on premise, or completely disconnected. Each deployment is created to address specific customer needs by provisioning VM instance images and data from the customer's centralized cloud tenancy. These workloads remain fully functional offline as the edge device adapts to the connection state, operates in harsh environmental conditions, and is ready to sync with the cloud whenever the connection is re-established.

FIG. 1 is a block diagram of an example high-level architecture for a cloud infrastructure edge computing device (e.g., edge device 100), according to at least one embodiment. An overview of the software and hardware component of the edge device 100 is provided below.

In some examples, the edge device 100 may include containerization engine 102 (e.g., Docker, Kubernetes, etc.) configured to implement one or more containers (e.g., corresponding to container(s) 104A, 104B, 104C, to 104N, collectively referred to as "container(s) 104"). A containerization engine (e.g., the containerization engine 102) may be container-orchestration system for automating computer application deployment, scaling, and management. In some embodiments, the containerization engine may be configured to provide OS-level virtualization to deliver software in packages called containers. These containers can be isolated from one another and utilize respective software, libraries, and configuration files, and can communicate with each other through well-defined channels. In some embodiments, service(s) 104 may include any suitable number of services (e.g., one or more). These services may implement at least some portion of centralized cloud capabilities. Each service may be stand-alone or operate as a distributed cluster. The edge device 100 may further include a hypervisor 106 configured to implement one or more virtual machines (e.g., virtual machines 108A, 108B, 108C, to 108N, collectively referred to as "virtual machine(s) 108" or "VMs 108").

In some examples, the edge device 100 includes storage 110 (e.g., object and/or block storage for storing local data). The edge device 100 includes operating system (OS) 112. In some embodiments, the OS 112 may be optimized for executing on an edge device and/or specific to execution on an edge device. OS 112 may be configured to manage the hardware of edge device 100 and supports a data plane of the services running on the edge device 100. The OS 112 may be configured to support a specific deployment type (e.g., a single edge device deployment, or a specific edge device cluster configuration). The OS 112 may be configured to secure the edge device by disallowing or otherwise blocking direct access by customers.

In some embodiments, the edge device 100 may include hardware such as any suitable number of central processing units (CPUs) and/or storage drives. For example, the edge device 100 depicted in FIG. 1 may have one, two, or more CPUs, with various numbers of cores per processing unit, and it may include any number of storage drives (e.g., 6.4 terabyte (TB) drives, or the like). As a non-limiting example, the edge device 100 may include block and/or object storage of any suitable size. The edge device 100 may include any suitable number of central processing units (CPUs), graphics processing units (GPUs), random access memory (RAM) of any suitable size, one or more ports (e.g., QSFP28, RJ45, dual ports, etc.), tamper-evident seals, or any suitable combination of the above components.

In some examples, the basic system functionality/services can be accessed via RESTful APIs have a custom load of software based on Linux. The virtual machine(s) 108 may individually be a Kernel-based Virtual Machines (KVM) (e.g., a virtual machine managed by a virtualization module in the Linux kernel that allows the kernel to function as a hypervisor) and/or a hardware-based Virtual Machine (e.g., a virtual machine managed by a virtualizer, such as Quick EMUlator (QEMU), that can perform hardware virtualization to enable virtual machines to emulate of number of hardware architectures). Although storage 110 is represented as a separate component from the service(s) 104 and VM(s) 108, it can run as a container (e.g., container 104A) or in a VM (e.g., VM 108A). In some examples, it may be favorable to implement the storage 110 (e.g., object storage, block storage, etc.) as a container.

Figure 2:
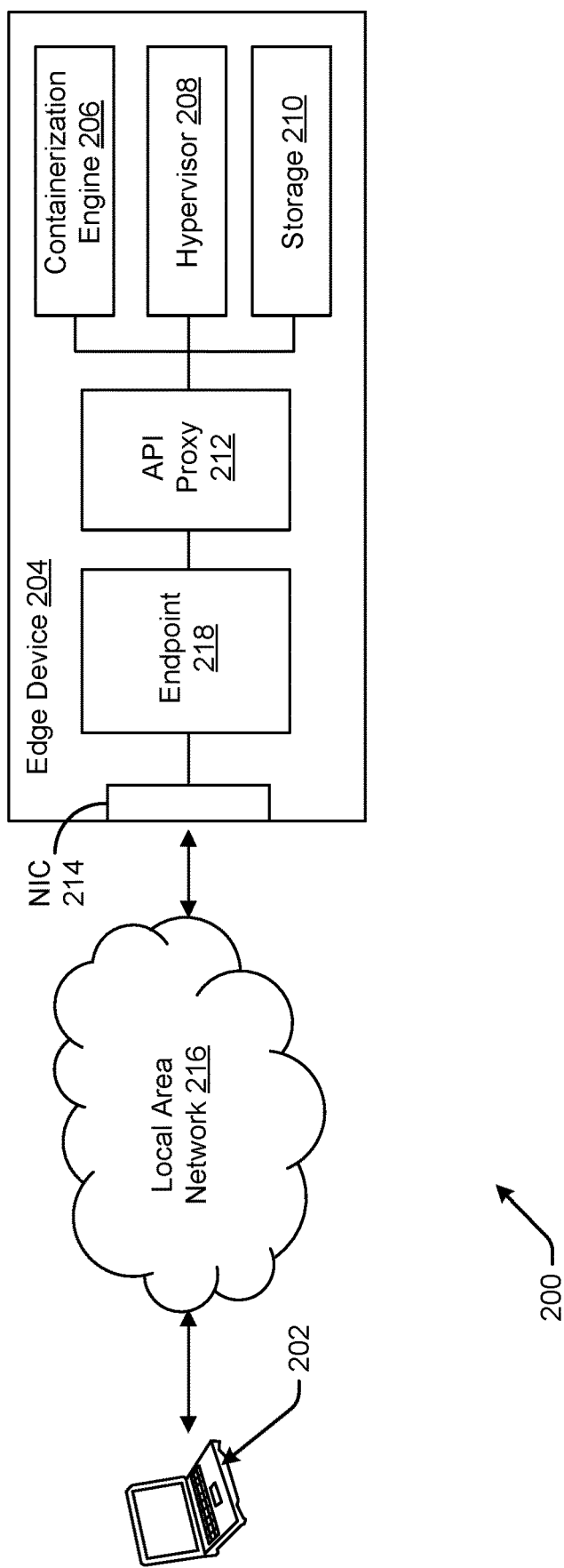
FIG. 2 is a block diagram of an example architecture for connecting a user computing device to a cloud infrastructure edge computing device, according to at least one embodiment.

FIG. 2 depicts an example architecture 200 for connecting the edge device described herein (e.g., edge device 100 from FIG. 1) to a computing device 202 (e.g., a user computing device). The computing device 202 can be any type of computing device including, but not limited to, a laptop computer, a desktop computer, or the like. The edge device 204 (an example of the edge device 100 of FIG. 1) may include containerization engine 206 (an example of the containerization engine 102 of FIG. 1), hypervisor 208 (an example of the hypervisor 106 of 1), and storage 210 (an example of the storage 110 of 1).

Additionally, as mentioned briefly above, the edge device 100 may include an API proxy 212 for managing the RESTful API calls received from the computing device 202. The API calls may enter the edge device 204 via network interface card (NIC) 214 that is internal to the edge device 204. The NIC 214 may be used to connect the edge device 204 to the computing device 202 via a local area network (e.g., the LAN 216). The API calls received by the NIC 214 may be transmitted to an exposed endpoint that may implement a Web server (e.g., endpoint 218). The web server can transmit the requests to the API proxy 212, which can route the requests to the appropriate service (e.g., containerization engine 206, hypervisor 208, and/or storage 210). The exposed endpoint/web server may also be configured to implement the lightweight console that is for use by the customer (e.g., the user interface displayed on the computing device 202).

The lightweight console can run within a web browser (e.g., Mozilla Firefox, or the like) on a laptop computer, desktop computer, or other network-accessible device (e.g., connected to the local area network (LAN 216)) that is network-connected to the edge device 204 (e.g., via a router, cable, etc.). The edge device 204 can expose the endpoint 218 for the console connection, and the web server can transmit data to the web browser of the computing device 202 over the LAN 216.

Figure 3:
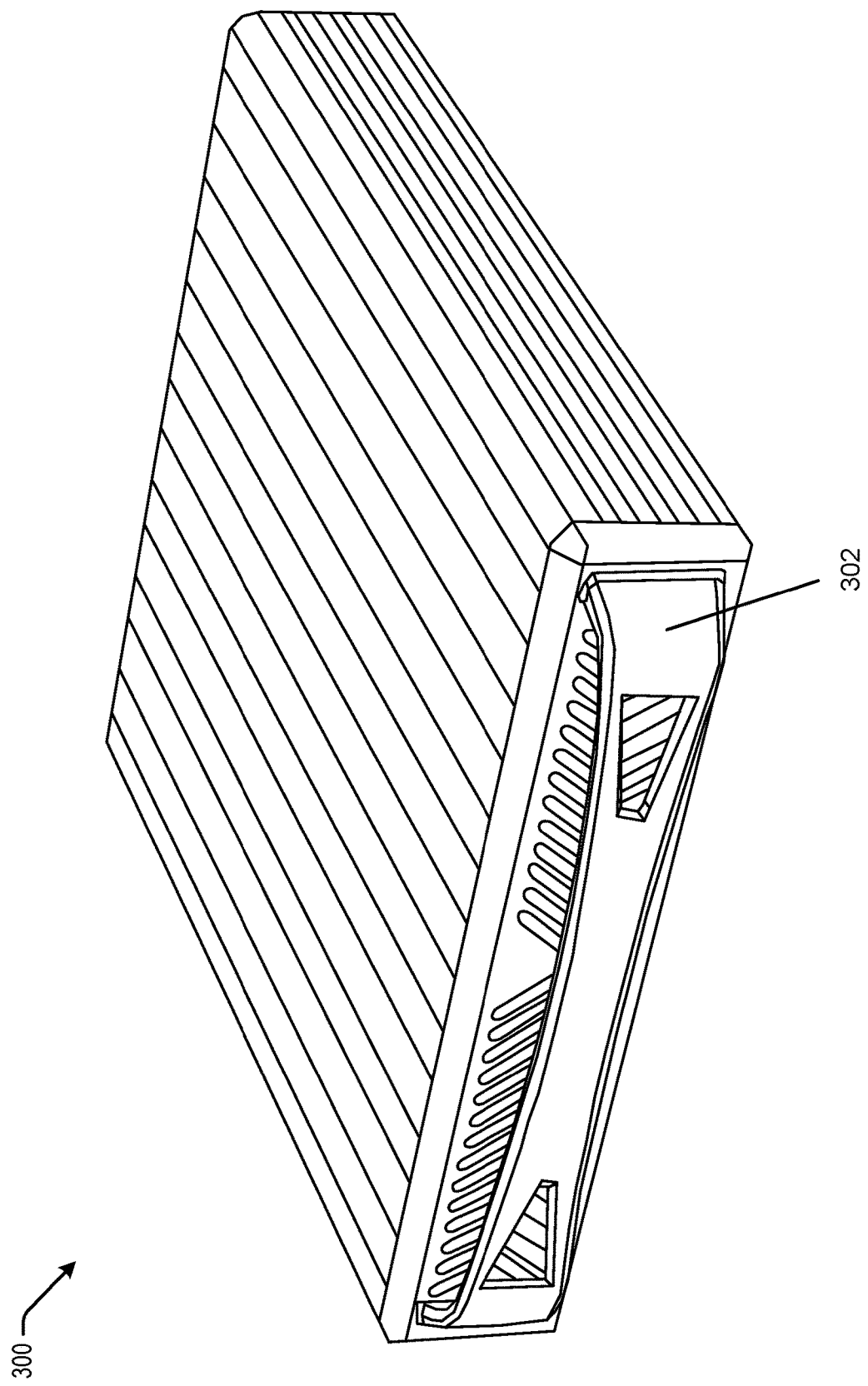
FIG. 3 is a block diagram of an example enclosure for a cloud infrastructure edge computing device, according to at least one embodiment.

FIG. 3 illustrates an example physical enclosure 300 of the edge device described herein (e.g., edge device 100 from FIG. 1). Various different form factors, shapes, colors, etc., can be employed to build a box (e.g., ruggedized) that can house the edge computing device. The physical enclosure can include handle 302, as shown, and may include tamper evident elements, so that if anyone breaks the enclosure open, it will be evident. In this way, the service provider that provides the edge computing device can ensure that the device is not modified. In some examples, the physical enclosure 300 may not be possible to open. However, in some cases, it might be possible, but it would require extreme measures.

Figure 4:
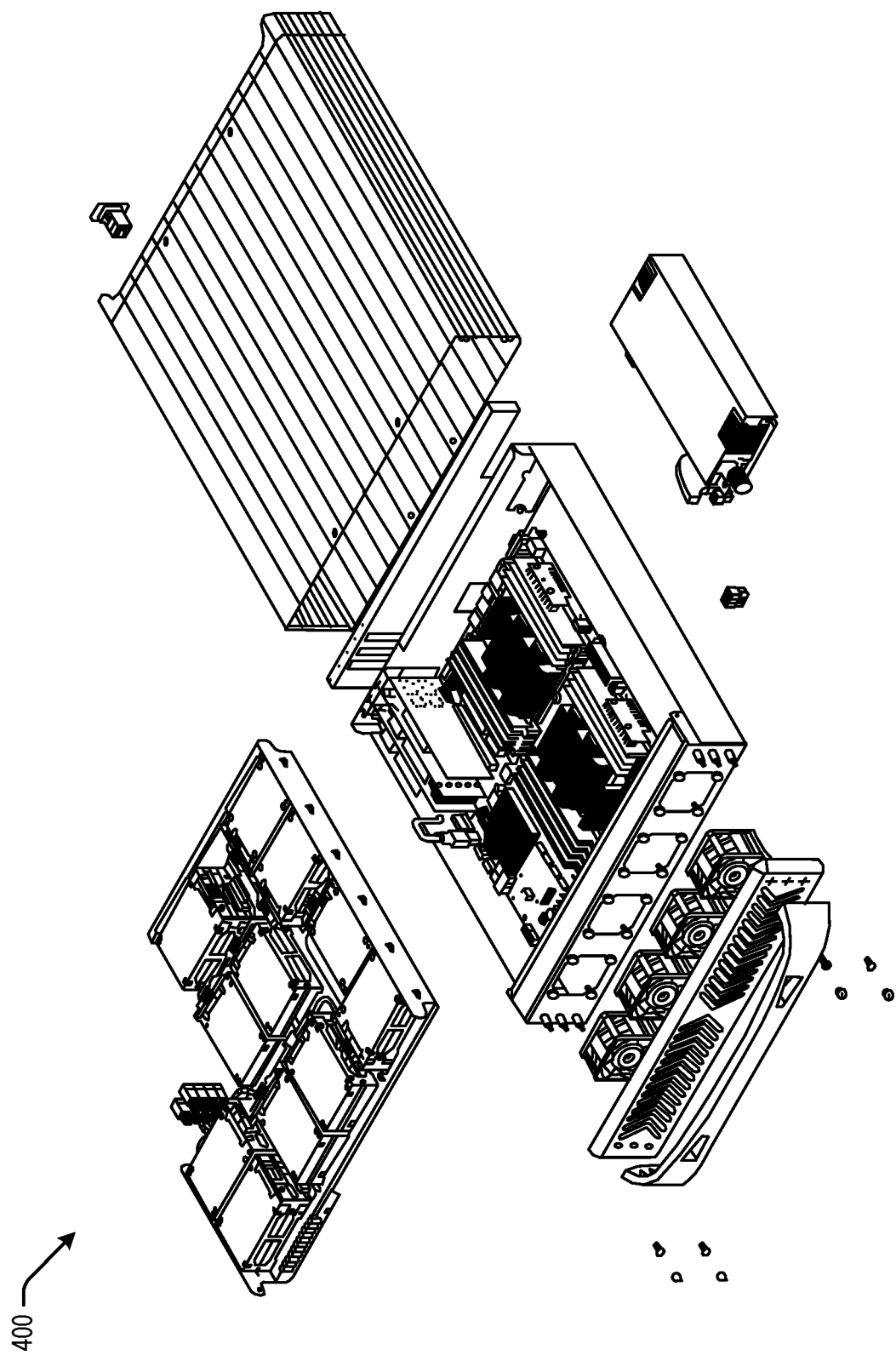
FIG. 4 illustrates an exploded view of the cloud infrastructure edge computing device described herein, in accordance with at least one embodiment.

FIG. 4 illustrates an exploded view of the cloud infrastructure edge computing device described herein (e.g., edge device 400, an example of the edge device 100 of FIG. 1), in accordance with at least one embodiment. The various components described with respect to FIGS. 1 and 2 can be communicatively attached to one or more motherboards and/or interface cards within the edge device 400. The illustrated configuration of components is but just one implementation. The specific locations of components shown is not intended to be limiting, and as noted, any configuration that is capable of implementing the functionality described herein is acceptable. Once the components are installed, the entire box can be closed, sealed, and locked with tamper-evident components.

The edge device 400 is a single enclosure. The enclosure may be designed to house any suitable number of serially attached SCSI (SAS) solid-state drives (SSDs) and all other components (e.g., CPU, memory, GPU, etc.) within the enclosure. The system may include one or more (e.g., 12 Gb) SAS connections to each drive in a fully contained sheet metal enclosure designed to fit within a standard 19" rack resting on an L bracket/shelf, on a table top or upright next to a desk with the use of a floor stand.

The system may include a tamper evident enclosure, front security plugs covering screws holding a front bezel in place with rear security interlock features. In some embodiments, the system may include a dual socket motherboard and any suitable amount of DRAM. In some embodiments, the system may include any suitable number (e.g., 2, 3, etc.) SATA SSDs, storage controllers, embedded network connections, one or more ports (e.g., dual ports, serial ports, etc.), one or more fans as part of a cooling system, or any suitable combination of the above.

As a non-limiting example, the edge device 400 may be made up of an external extruded aluminum case secured in the front with a vented bezel and rear panel only exposing I/O connections required for data transfer and management. Mounting can be designed to mount the any suitable motherboard, fans, and power supply.

Figure 5:
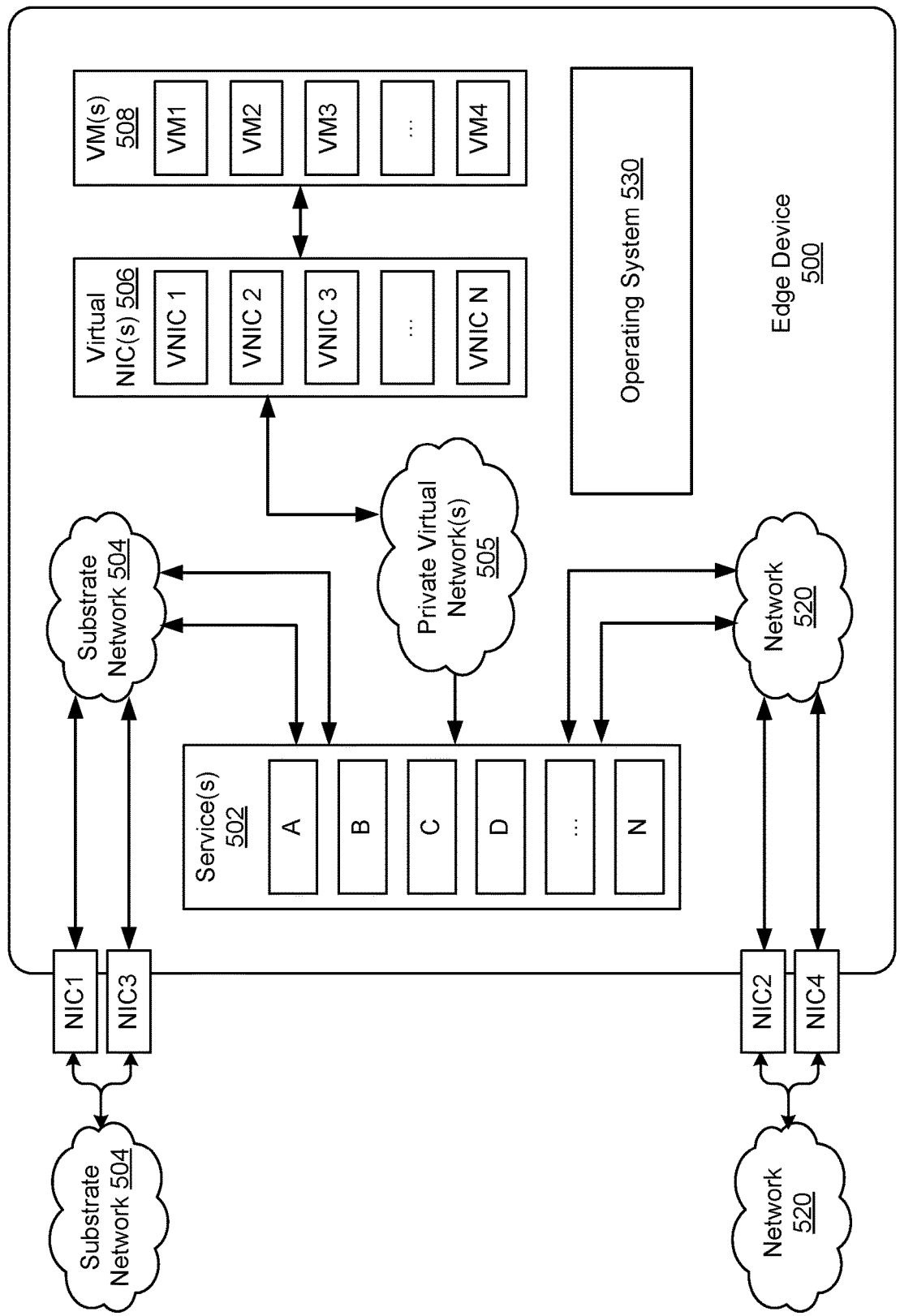
FIG. 5 is a block diagram of an example computer architecture of a cloud infrastructure edge computing device, according to at least one embodiment.

FIG. 5 is a block diagram of an example computer architecture of a cloud infrastructure edge computing device (e.g., edge device 500, an example of the edge devices 100 and 204, of FIGS. 1 and 2, respectively), according to at least one embodiment. The edge device 500 can be thought of as a cloud-integrated service that extends some or all of conventional cloud capabilities to locations that may not be accessible by or have access to cloud data centers. This can be achieved via portable ruggedized server nodes that provide cloud-like functionality in locations with no WAN connectivity. This allows customers to shift select cloud workloads to remote locations and enable intensive data processing operations close to the data ingestion points at the edge of their cloud infrastructure.

The edge device 500 may include any suitable number of services (e.g., service(s) 502). Each service may run as a container (e.g., a Docker container) locally on the edge device 500. The service(s) 502 may be communicatively connected via a substrate network 504 such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 500 is shipped to the user). The edge device's system software (including service(s) 502) may execute in the secure environments protected by boot security software (e.g., Trenchboot Secure Launch). Users may be restricted from accessing the secure environment and/or the substrate network 504. To minimize the resources used by these services, the service code may be compiled and saved to disk to decrease RAM space as well as decrease the CPU load on the edge device 500.

Some example services included in service(s) 502 may include a UI console service, an identity control plane (CP) service, an identity data plane (DP) service, a compute application programming interface (API) service, a compute worker thread service, a virtual network (VN) API service, a block storage API service, a function-as-a-service service, an events service, an object storage management service (e.g., implementing a storage platform such as Ceph Storage or the like), a compute DP service (e.g., an example of hypervisor 208 of FIG. 2), a VN DP service, a block storage management service, a function-as-a-service API service, a function-as-a-service load balancing (LB) service, a function-as-a-service process thread service, a distributed data store management service (e.g., etcd3), a dynamic host configuration protocol service, a domain name system service, a network time protocol (NTP) service, to name a few. Some example functionality provided by these services is discussed below.

By way of example, compute DP service may be configured (e.g., preconfigured and provisioned onto the edge device 500) to isolate the VM(s) 508 on the same hypervisor host. The compute DP service can utilize any suitable container engine (e.g., Docker container, MicroContainer, or the like) to isolate the VM(s) 508 on the same hypervisor host from each other. The compute DP service may utilize any suitable hypervisor (e.g., Quick EMUlator (QEMU), Kernel-based Virtual Machine (KVM), etc.) to provide virtual hardware emulation for VM(s) 508. In some embodiments, VNIC(s) 506 are attached to subnets of any suitable number of virtual networks (e.g., private virtual network(s) (PVN(s))) 505 and are assigned private Internet Protocol (IP) addresses. One VM may have multiple VNICs from different VCNs and different subnets. The maximum number of VNICs can be limited by predefined thresholds (e.g., configuration data referred to as "VM shape" that defines VNICs per VM count, VNIC shape, etc.). In some embodiments, the predefined thresholds are applied to each of the VM(s) 508. The subnets utilized by the VNIC(s) 506 may be isolated by VLANs. In some embodiments, some or all of the VNIC(s) 506 may be assigned public and/or private IP addresses. A public IP address is an address in the network 520, while a private IP address refers to an IP address of the PVN(s) 505.

In some embodiments, the edge device 500 implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) 508. In some embodiments, DHCP service assigns private IP addresses to each of the VNIC(s) 506, each of the VM(s) 508 having one or more VNICS. DNS service may provide domain name resolution to VM(s) 508 on the edge device 500. NTP may provide time synchronization to VM(s) 508. In some embodiments, a public IP service executing as part of service(s) 502 may enable a VM to access a public API without assigning the VM a public IP and without configuring a service gateway.

In some embodiments, at least one of the VM(s) 508 may implement block (or object) storage. In some embodiments, the hypervisor associated with a virtual machine may include a library that enables the hypervisor to use a distributed data storage platform (e.g., Ceph). The library may utilize a protocol associated with that storage platform (e.g., RADOS Block Device (RBD)) to facilitate storage of block-based data. The distributed data storage platform may be implemented over multiple virtual machines. In some embodiments, the distributed data storage platform supports making snapshots and copying block volumes. VM images and VM block volumes can be Ceph block devices. In some embodiments, the VM(s) implementing the distributed data storage platform will use system-reserved resources (e.g., eight CPU cores, or any subset of the total number of CPUs available on the edge device 500). For example in order to provision a boot volume, a block device image may be copied to a boot volume of the block device. The distributed data storage platform may use block devices that include multiple nodes for redundancy. If some node fails then the block device can continue to operate. In some embodiments, the distributed data storage platform (e.g., Ceph or the like), automatically recovers the block device data in case of a few node failures. Block storage may be utilized to store images for any suitable deployable resource. By way of example, an image may be utilized for launching VMs. In some embodiments, the image may correspond to a particular VM shape (e.g., a compute heavy VM, a GPU optimized VM, a storage VM, and the like).

Compute API service may support the following operations: 1) VM launch and terminate, 2) VM stop, start, reboot, 3) List VMs and/or get information on a specific VM, 4) obtain VM console history API, 5) obtain a VM snapshot, 6) attach/detach block volumes, and the like. In some embodiments, Compute API service can be used to call other services (e.g., compute DP service, identity DP service for authentication and authorization, etc.).

Some of the functionality of other services will be discussed in connection with FIG. 7. In general, although each service may not be discussed in detail herein, the general functionality provided by the service(s) 502 may include the functionality of cloud services provided by a remote cloud service provider. In some embodiments, the edge device 500 may be associated with a predefined region and/or realm such that some of the service(s) 502 may operate as if they were operating in a cloud computing environment, despite the fact they are operating on one or more local device(s) (one or more edge devices) as a single instance or as part of a distributed service that may have no or intermittent public network access to a cloud computing environment associated with the customer. A "region" refers to a geographic location at which a service center resides. A "realm" refers to a logical collection of regions. Realms may be isolated from each other and do not share data.

In some embodiments, the edge device 500 may provide any suitable number of virtual networks (e.g., PVN(s) 505) using compute, memory, and networking resources (e.g., virtual network interface card(s) (VNIC(s) 506)). A virtual network is a logical network that runs on top of a physical substrate network. Using the service(s) 502, one or more customer resources or workloads, such as virtual machines (e.g., virtual machine(s) (VM(s)) 508, executing a compute instance) can be deployed on these private virtual networks. Any suitable combination of VM(s) 508 can execute functionality (e.g., a compute instance, storage, etc.) which is individually accessible through a virtual NIC (e.g., one of the virtual NIC(s) 506). Each VM that is part of a PVN is associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 505 can take on many forms, including peer-to-peer networks, IP networks, and others. In some embodiments, substrate network traffic of the service(s) 502 may be encrypted and/or isolated (e.g., by virtue of different PVNs or subnets) from network traffic of one or more the VM(s) 508 executing on the edge device 500.

The edge device 500 thus provides infrastructure and a set of complementary services that enable customers to build and run a wide range of applications (e.g., compute instances), services, and/or storage in a highly available, physically local, and virtual hosted environment. The customer does not manage or control the underlying physical resources provided by the edge device 500 but has control over expanding or reducing virtual machines (e.g., compute instances, virtual NICs, block or object storage, etc.), deploying applications to those virtual machines, and the like. All workloads on the edge device 500 may be split into different CPU sets (e.g., VM and non-VM). One set (e.g., non-VM such as workloads performed by the service(s) 502) may utilize a subset of CPU cores (e.g., 8) of the edge device 500, while the other set (e.g., VM workloads performed by the VM(s).

The edge device 500 may be communicatively connected to a user device (e.g., the computing device 202 of FIG. 2) via one or more network interfaces (e.g., NIC2 and/or NIC 4) and network 520 to interact and/or manage the VM(s) 508. In certain embodiments, a lightweight console can be provided at the user device via a web-based user interface that can be used to access and manage the edge device 500. In some implementations, the console is a web-based application (e.g., one of the service(s) 502) provided by the edge device 500.

FIG. 5 depicts a single edge device. However, it should be appreciated that more than one edge device may be utilized as a distributed computing cluster.

Figure 6:
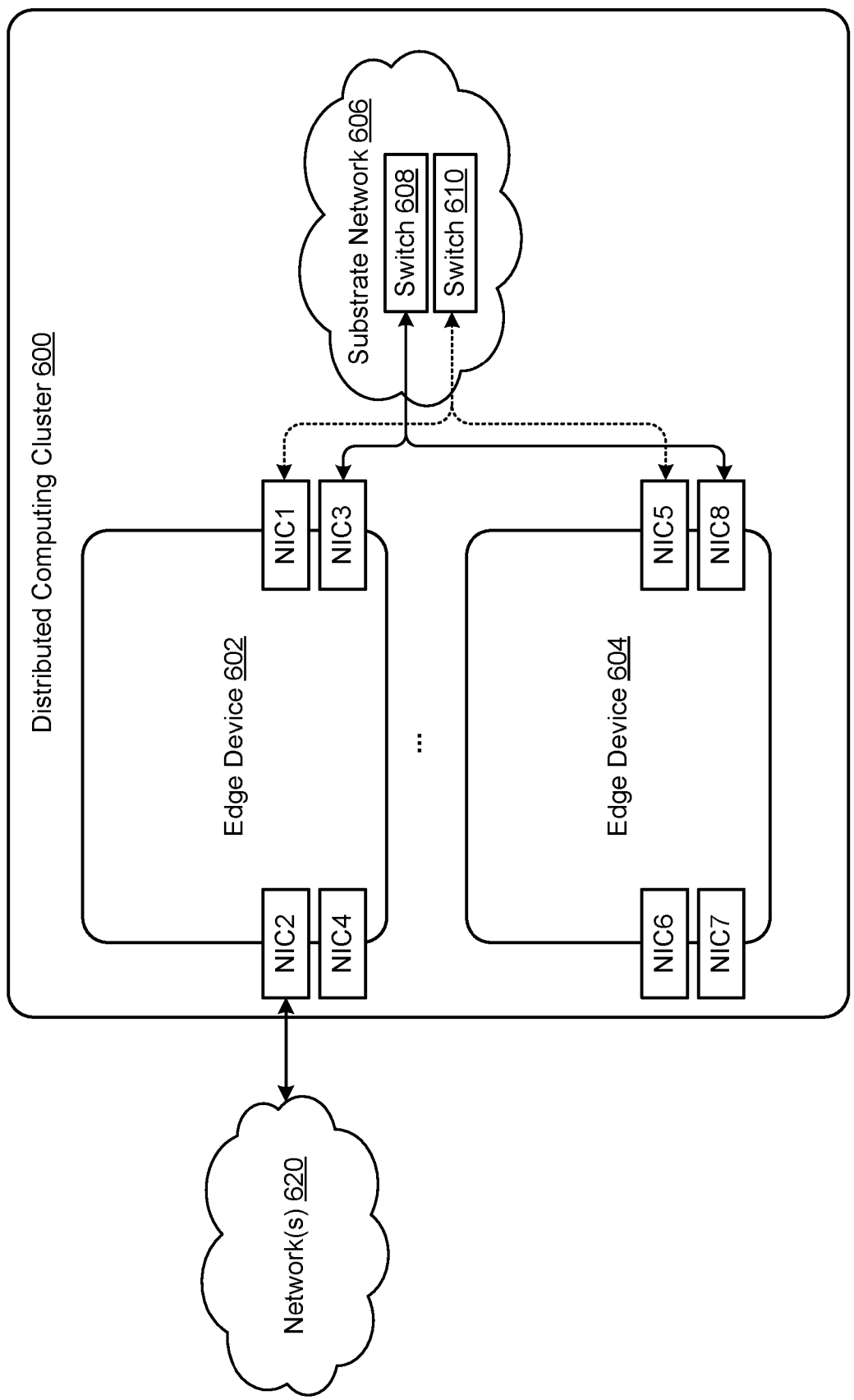
FIG. 6 is a block diagram depicting a distributed computing cluster that includes one or more edge computing devices, according to at least one embodiment.

FIG. 6 is a block diagram depicting a distributed computing cluster 600 that includes one or more edge computing devices (e.g., edge device 602 and 604, each an example of the edge device 500 of FIG. 5), according to at least one embodiment.

Each edge device of the distributed computing cluster 600 may be connected via substrate network 606 (an example of the substrate network 504 of FIG. 5. In some embodiments, the edge devices of the distributed computing cluster 600 (sometimes referred to as "edge computing nodes" or "edge nodes") may be connected by the substrate network 606 using one or more switches (e.g., switch 608 and/or 610). In some embodiments, NIC1 and NIC5 may include a particular connector (e.g., RJ45 connector) while NIC3 and NIC8 may include the same or a different connector (e.g., a QSFP28 100 GbE connector). In some embodiments, only one edge device of the distributed computing cluster 600 is connected to a customer network such as network(s) 620 (an example of the network 520 of FIG. 5). Thus, not only may traffic between services of an edge device be encrypted and isolated from other traffic of a given edge device, but traffic between distributed services operating across multiple edge devices may also be encrypted and isolated from other traffic of the computing cluster. In some embodiments, each edge device is preconfigured as a particular node in the distributed computing cluster 600. In other embodiments, the user can configured the number and topology of the edge devices of the distributed computing cluster 600.

Figure 7:
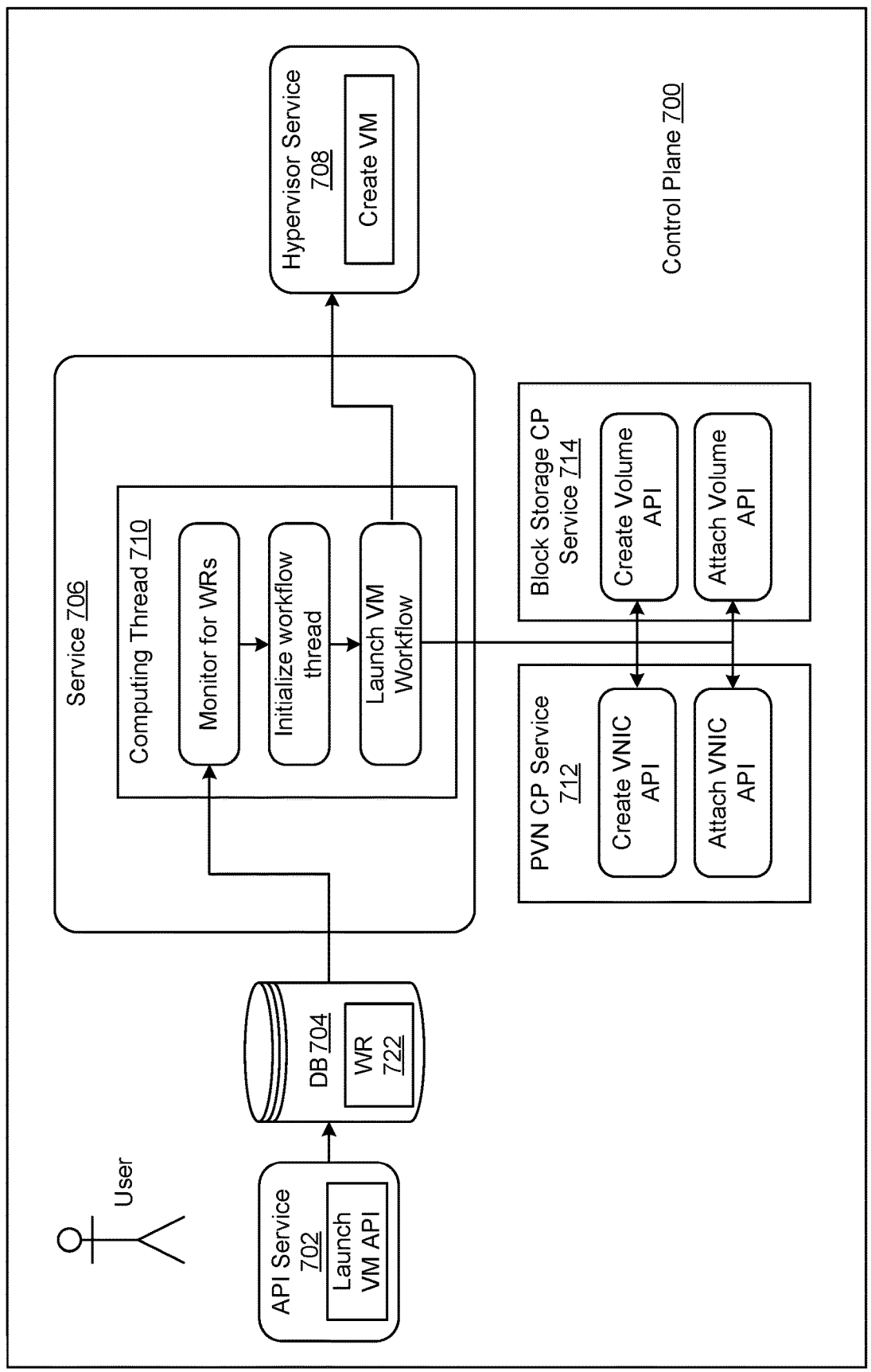
FIG. 7 is a block diagram depicting a control plane and flow for executing a workflow by one or more components of a cloud infrastructure edge computing device, according to at least one embodiment.

FIG. 7 is a block diagram depicting a flow 700 for executing a workflow by one or more components of a cloud infrastructure edge computing device, according to at least one embodiment. Components that execute the flow 700 may include API service 702, database (DB) 704, service 706, hypervisor service 708, PVN CP service, Block storage CP service 714, although more or fewer services may be included. In some embodiments, each of the services of FIG. 7 are an example of a service of the service(s) 502 of FIG. 5. In some embodiments, at least some of the functionality discussed in connection with the services of FIG. 7 may be combined in any suitable combination and provided as a single service or instances of the same service. By way of example, in some embodiments, the functionality of services 702-708 may be provided by a single service (e.g., compute CP service discussed above in connection with FIG. 5). In some embodiments, the functionality provided by the services 702-708 may be provided by a single edge device (e.g., edge device 500 of FIG. 5) or by two or more edge devices (e.g., by edge device 602 and edge device 604 of FIG. 6).

In some embodiments, the API service 702 may be configured to accept work requests that include intended state data that describes an intended state of a set of data plane resources (e.g., VM(s) 508 of FIG. 5). As a non-limiting example, user 720 may utilize a user device (e.g., the user device *202 of FIG. *2) to access a user interface with which he can make various selections indicating a desire to launch a VM. The user input may be received by the API service 702 (an example of the compute CP service of FIG. 5) which may generate a work request (WR) (e.g., WR 722) and utilize a predefined Launch VM API to store the work request in a distributed database (e.g., DB 704). In some embodiments, the DB 704 may be a computing cluster, which is configured to use etcd3 as an immediately consistent, highly-available, transactional, distributed database. Generally, a work request indicates a desire and information needed to create and/or modify data plane resources such as VM(s) 508. In some embodiments, the work request includes state information indicating a desired state for the data plane resource. In some embodiments, the DB 704 may be accessible to all services operating on any edge device (and by services operating on any suitable edge device of an edge device cluster such as distributed computing cluster 600).

Service 706 (e.g., an example of the compute CP service of FIG. 5) may be configured to execute one or more worker processes (e.g., one or more computing threads, such as computing thread 710). Some of these worker processes may be configured by the service 706 at any suitable time to execute a continuous and/or ongoing predefined workflow. By way of example, the service 706 may configure one or more worker threads (e.g., including computing thread 710) to monitor the DB 704 for new work requests (e.g., WR 722). The computing thread may be configured to determine if a work request WR 722 is already being attended to. In some embodiments, this entails checking a predefined storage bucket within DB 704 for a unique identifier associated with WR 722. If the unique ID included within WR 722 does not appear in the bucket (or the WR is otherwise indicated as having not been picked up for processing), the computing thread 710 (e.g., a nanny thread) may initialize a workflow thread (e.g., another instance of a computing thread 710) which may then be configured by the computing thread 710 to execute a workflow corresponding to launching a VM corresponding to the WR 722.

The initialized workflow thread may be communicatively coupled (e.g., via the substrate network 504 of FIG. 5) to a workflow service (not depicted). The workflow service may be configured to identify, from one or more predefined workflows, a predefined workflow that corresponds to launching a VM, and therefore, to the WR 722. These predefined workflows identify one or more steps/operations to be taken, and a sequence to those steps, in order to achieve a predefined goal (e.g., launching a virtual machine, stopping/starting a virtual machine, terminating a virtual machine, creating a block volume, removing a block volume, etc.). The workflow thread may launch the VM workflow and oversee its execution by various other entities. In some embodiments, the workflow thread may pass any suitable portion of the intended state data of the DP resource to any suitable combination of services.

As a non-limiting example, as part of the workflow for launching a virtual machine (e.g., a VM to be hosted by hypervisor service 708), one or more APIs can be called for creating and attaching the VNIC. Similarly, a number of APIs may be provided for creating and/or attaching a block storage volume API. In some embodiments, the workflow thread may perform any suitable call to one or more APIs to invoke the functionality of PVN CP Service 712, which in turn may be configured to create and attach a VNIC. The workflow thread may then call block storage CP service 714 which may then execute any suitable operations to create and attach a block storage volume. The worker thread overseeing the workflow may ensure a designated order (e.g., create the VNIC first before creating the block volume). This worker thread may be configured to catch any errors and/or exceptions from one or more services it has invoked. If no exceptions/errors are encountered, the worker thread overseeing the workflow can provide any suitable data to the hypervisor service 708 (via the substrate network), which in turn, execute functionality for creating the VM requested. The hypervisor service 708 may provide actual state data for the newly launched VM. In some embodiments, the worker thread overseeing the workflow can store the actual state data in the DB 704 for later reference (e.g., when a monitor may determine whether the actual state data matches the requested state data indicating no changes needed or when the actual state data fails to match the requested state data, indicating a change of the data plane resources is needed).

In some embodiments, the workflow thread may be communicatively coupled to a cluster manager (not depicted). Cluster manager may be configured to manage any suitable number of computing clusters. In some embodiments, the cluster manager may be configured to manage any suitable type of computing cluster (e.g., a Kubernetes cluster, a set of computing nodes used to execute containerized applications, etc.). The workflow thread may be configured to execute any suitable operations to cause the cluster manager to execute any suitable orchestration operation on the DP resource(s) (e.g., a VM) in accordance with the instructions identified to bring the DP resource(s) in line with the intended state data. In some embodiments, a monitoring entity (e.g., the workflow thread, a thread launched by the workflow thread) may be communicatively coupled to DP resource(s) 116 and configured to monitor the health of DP resource(s). In some embodiments, the monitoring entity may be configured to store any suitable health data in the DB 704.

The specific operations and services discussed in connection with FIG. 7 is illustrative in nature and is not intended to limit the scope of this disclosure. The particular operations performed and services utilized may vary depending on the particular workflow associated with the requested operations.

Provisioning Management

Techniques are provided (e.g., a method, a system, non-transitory computer-readable medium storing code or instructions executable by one or more processors) for managing the provisioning process of a cloud-infrastructure edge computing device (e.g., a computing device configured to deliver computing and storage at remote locations separate from the centralized data center and lacking a public/private network connection, hereinafter referred to as an "edge device," for brevity). The edge device may be used at remote locations, separate from a centralized cloud computing environment. In some embodiments, composing an edge device may utilize a manifest that specifies the configuration for that device. By way of example, the edge device may be provisioned and configured according to the configuration specified by the manifest. At times, it may be desirable to provision the edge device with, or otherwise allow access to, particular resources (e.g., objects, files, virtual machine images, etc.) that may be obtainable from a user's cloud-computing tenancy (e.g., from object storage, block storage, etc.). As used herein, term "provision" is intended to include any suitable combination of provisioning, configuring, or deploying artifacts to a computing device (e.g., an edge device). Conventional techniques include performing manual operations for enabling this access which are error prone and may lead to unnecessary delay in the provisioning process. This in turn can lead to a suboptimal user experience and increased operational overhead for the cloud computing environment provider.

Access to resources of the centralized cloud computing environment may be managed by a variety of policies. To enable the edge device to be provisioned with or otherwise access the requested resources, an access control policy may be needed that specifies the access (e.g., read and/or write access) is allowed. These types of policies are conventionally written by the user. However, if the policy does not exist when the edge device is configured, the requested configuration may not be possible and provisioning operations may fail. It can be time-consuming and resource intensive to identify the reason that provisioning failed. As a result, there can be significant delay in identifying and notifying the user that the policy is missing. This can lead to unnecessary delay in the provisioning process and an unpleasant user experience. Techniques are described herein include validating that appropriate access control policies exist for one or more edge devices prior to provisioning and/or configuring these devices. Various embodiments are described herein, including methods, systems, non-transitory computer-readable storage media storing programs, code, or instructions executable by one or more processors, and the like.

Figure 8:
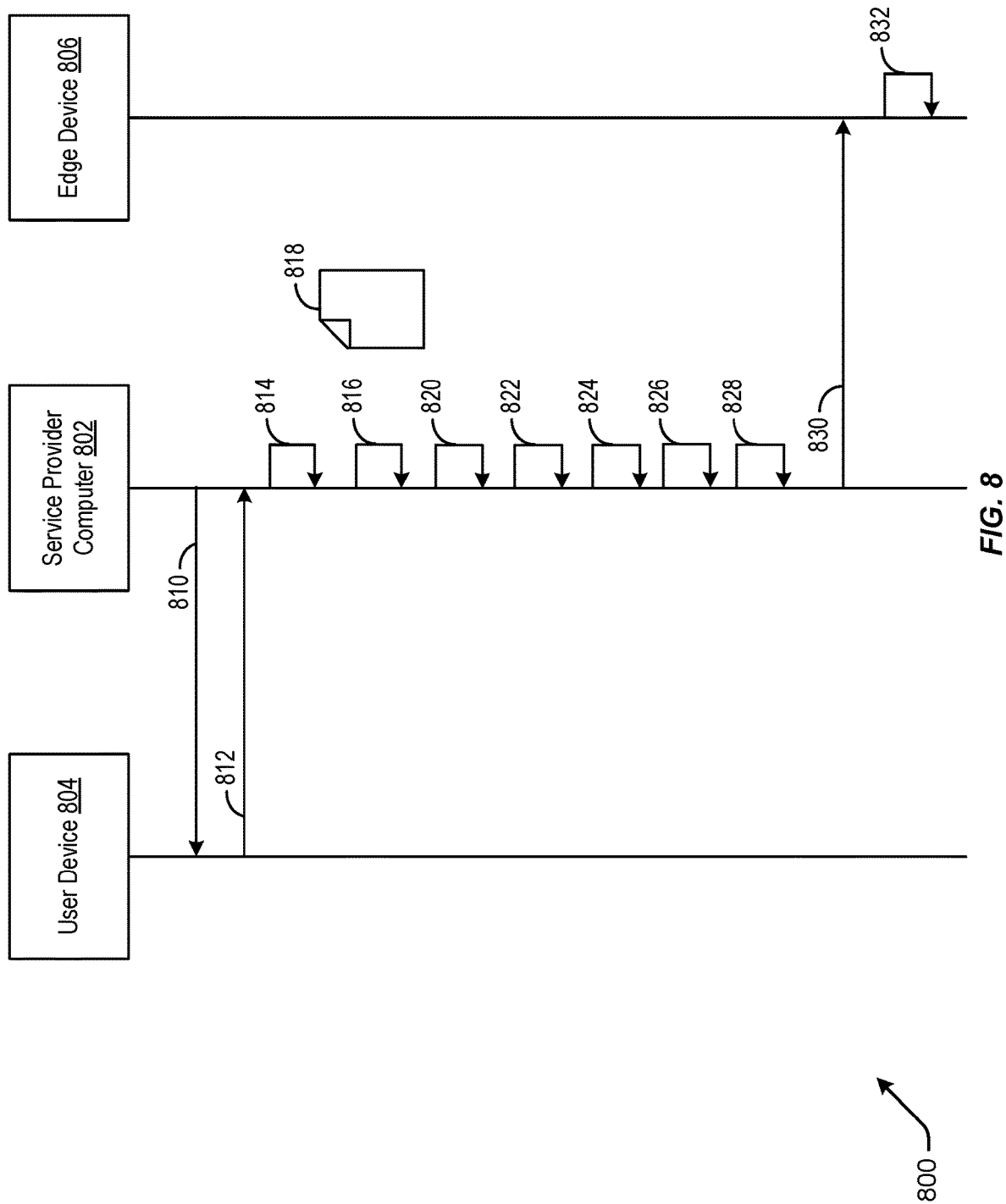
FIG. 8 is a block diagram depicting a flow for generating a manifest from a user request, according to at least one embodiment.

FIG. 8 is a block diagram depicting a flow 800 for generating a manifest from a user request, according to at least one embodiment. FIG. 8 depicts a service provider computer (e.g., service provider computer 802). Service provider computer 802 (e.g., including one or more computing devices) can be operated by or on behalf of a cloud-computing provider. In some embodiments, the service provider computers 802 of FIG. 8 implement a cloud-computing service for generating a manifest from which one or more edge devices can be configured. The service provider computers 802 of FIG. 8 may be communicatively connected to or operate as part of a cloud-computing environment operated by the cloud-computing provider. The user device 804 may be any suitable electronic device (e.g., a laptop, desktop, smartphone, or the like) and communicatively connected to the service provider computer 802 via a network (e.g., a public or private network). Service provider computer 802 may be configured to host one or more interfaces from which user input may be provided. These user interfaces may relate to configured one or more edge devices.

Figure 10:
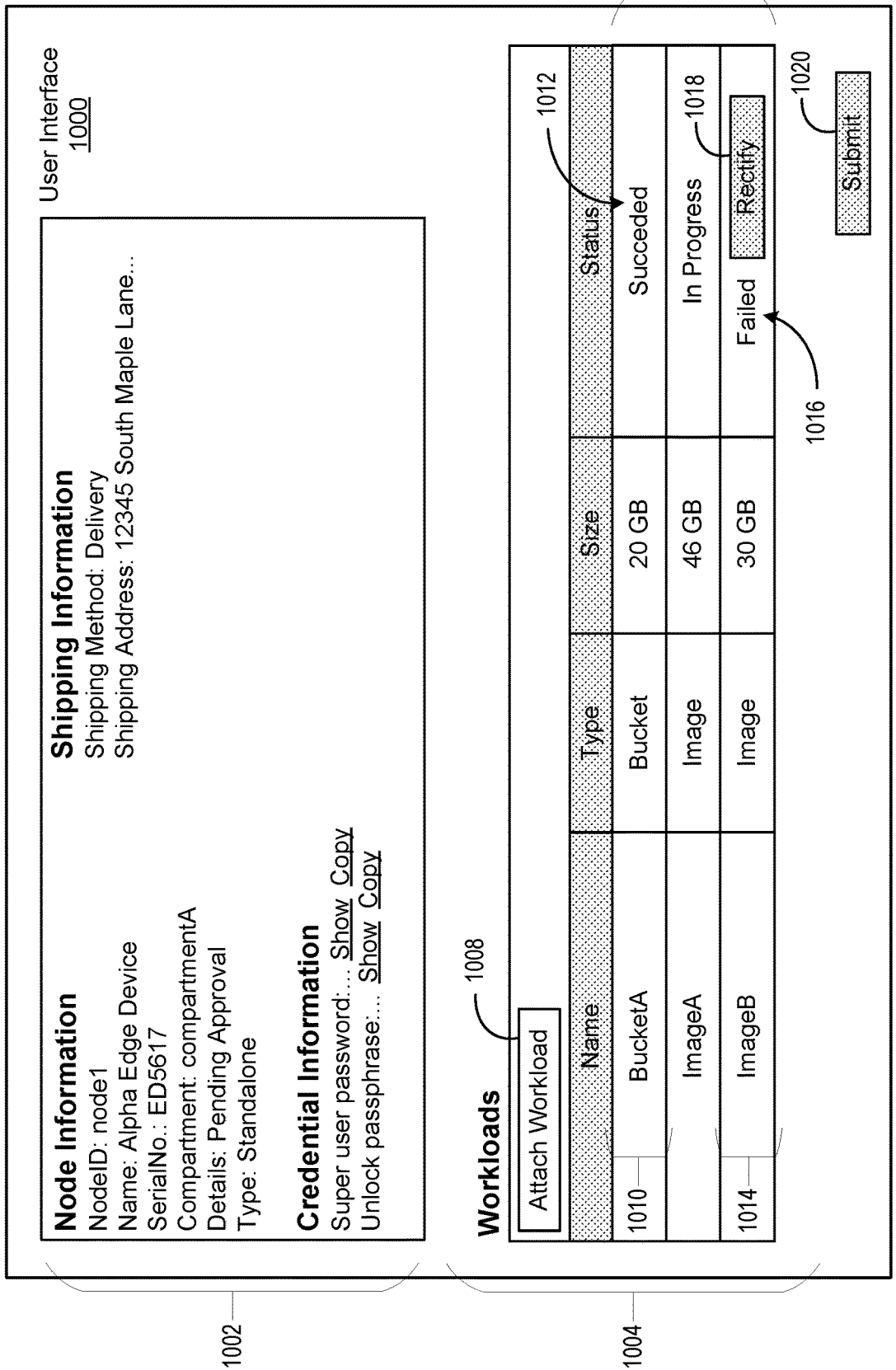
FIG. 10 is a schematic diagram illustrating an example user interface for designating one or more workloads to be provisioned at an edge device, in accordance with at least one embodiment.
Figure 11:
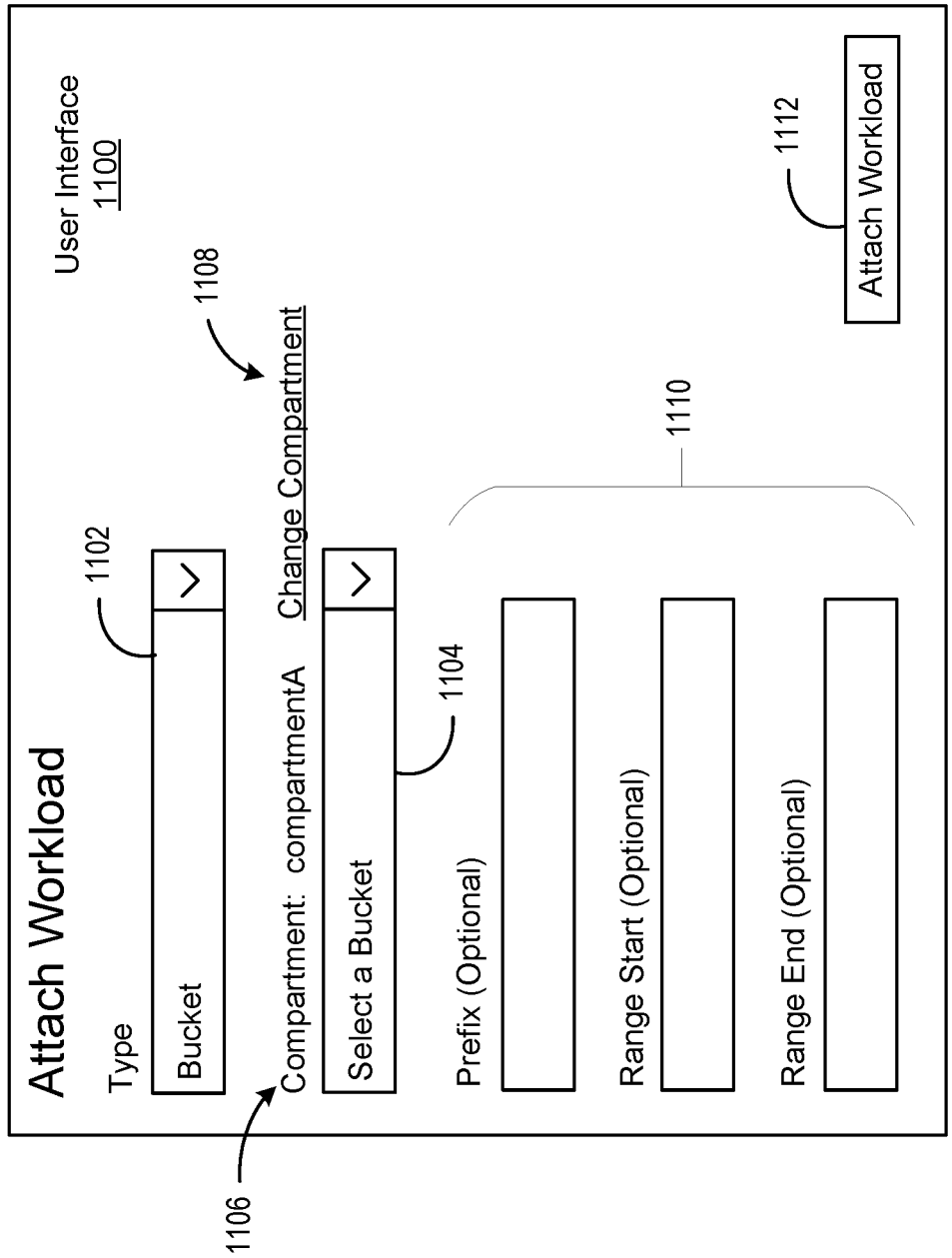
FIG. 11 is a schematic diagram illustrating an example user interface for specifying attributes of a workload to be provisioned at an edge device, in accordance with at least one embodiment.

The flow 800 may begin at 810, where the service provider computer 802 exposes one or more user interfaces from which user input may be obtained. The exposed interfaces may be used to define a configuration via configuration data (e.g., node identifier (ID), node name, device attributes, network interface card information, driver information, image name, image storage location within a centralized cloud-computing environment, network name, network addresses, virtual machine information corresponding to one or more virtual machines, or any suitable attribute of the edge device 806). In some embodiments, these user interfaces enable a user to select various resources (e.g., objects, files (e.g., data files, configuration files, etc.), images (e.g., virtual machine images, service images, etc.), etc.) to be configured at one or more edge devices (of which edge device 806 is an example). These data plane resources may also be referred to herein as "workloads." In some embodiments, the user may define a cluster of edge devices and their corresponding configurations. Thus, via these interfaces, the user can indicate the edge device 806 is to be compute intensive (e.g., where a majority of virtual machines executing at the edge device 806 are providing computing resources), storage intensive (e.g., where a majority of virtual machines executing at the edge device 806 are providing storage resources), GPU intensive (e.g., where a majority of virtual machines executing at the edge device 806 are providing GPU resources), or the like (e.g., based at least in part on a number of virtual machines requested and the specific configuration of these virtual machines as selected by the user). The user interfaces may be in any suitable format that allows the user to select and/or define these attributes of one or more edge devices (e.g., the edge device 806). FIGS. 10 and 11, discussed below, provide a number of example user interfaces that enable a user to specify aspects of resources to be provisioned to a given edge device.

At 812, the user device 804 may submit the user input in a user request that is received by the service provider computer 802. The service provider computer 802 may be hosting, within a centralized cloud-computing environment, a build service and/or a service specific to edge devices. In some embodiments, any suitable number of user requests may be transmitted to the service provider computer 802 as the user incrementally specifies various aspects of one or more edge device configurations.

At 814, the service provider computer 802 may execute any suitable operations for validating the user's request. By way of example, when the user request includes data corresponding to a resource to be provisioned to the edge device(s) (e.g., to the edge device 806), the service provider computer 802 may execute any suitable operations for verifying that one or more corresponding access control polices exist that enable the edge device to access storage locations corresponding to those resources. In some embodiments, the service provider computer 802 may generate a credential on behalf of the edge device(s) (e.g., edge device 806). The service provider computer 802 may utilize the credential to execute a number of application programming interface (API) calls (e.g., GET calls) to a number of computing components (e.g., services) configured to manage the storage locations identified in the request. Based at least in part on the response received from those computing components, the service provider computer 802 may determine that the resource is accessible or inaccessible to the edge device 806. In some embodiments, if one or more resources identified in the request are inaccessible to the edge device 806, the service provider computer 802 may be configured to deny the request. In these scenarios, the service provider computer 802 may provide any suitable information to the user device 804 to indicate the denial and/or a reason for which the request was denied (e.g., the access control policy enabling access by the edge device 806 to the specified resource is missing). In some embodiments, the service provider computer 802 may cease operations after determining that one or more resources are inaccessible to the edge device 806 and/or after transmitting information to the user device 804 regarding the denial. Alternatively, if the service provider computer 802 determines that the resources identified in the request are accessible to the edge device 806, the flow may proceed to 816. Example operations performed by the service provider computer 802 to validate the user's request are described in greater detail in connection to FIG. 12.

At 816, the service provider computer 802 may generate a manifest 818 (e.g., a record, a file, etc.) corresponding to the user request. The manifest 818, once complete, may be utilized to configure the edge device according to the user request. In some embodiments, the service provider computer 802 may generate manifest 818 based at least in part on a predefined template. In some embodiments, manifest 818 may be in any suitable format (e.g., JSON, XML, etc.). Initially, the manifest 818 may be at least partially incomplete. Once generated, the service provider computer 802 may modify the manifest 818 to correspond to the user request. By way of example, the manifest 818 may be modified to include configuration data for one or more edge devices as provided in the user input received at 812.

Figure 9:
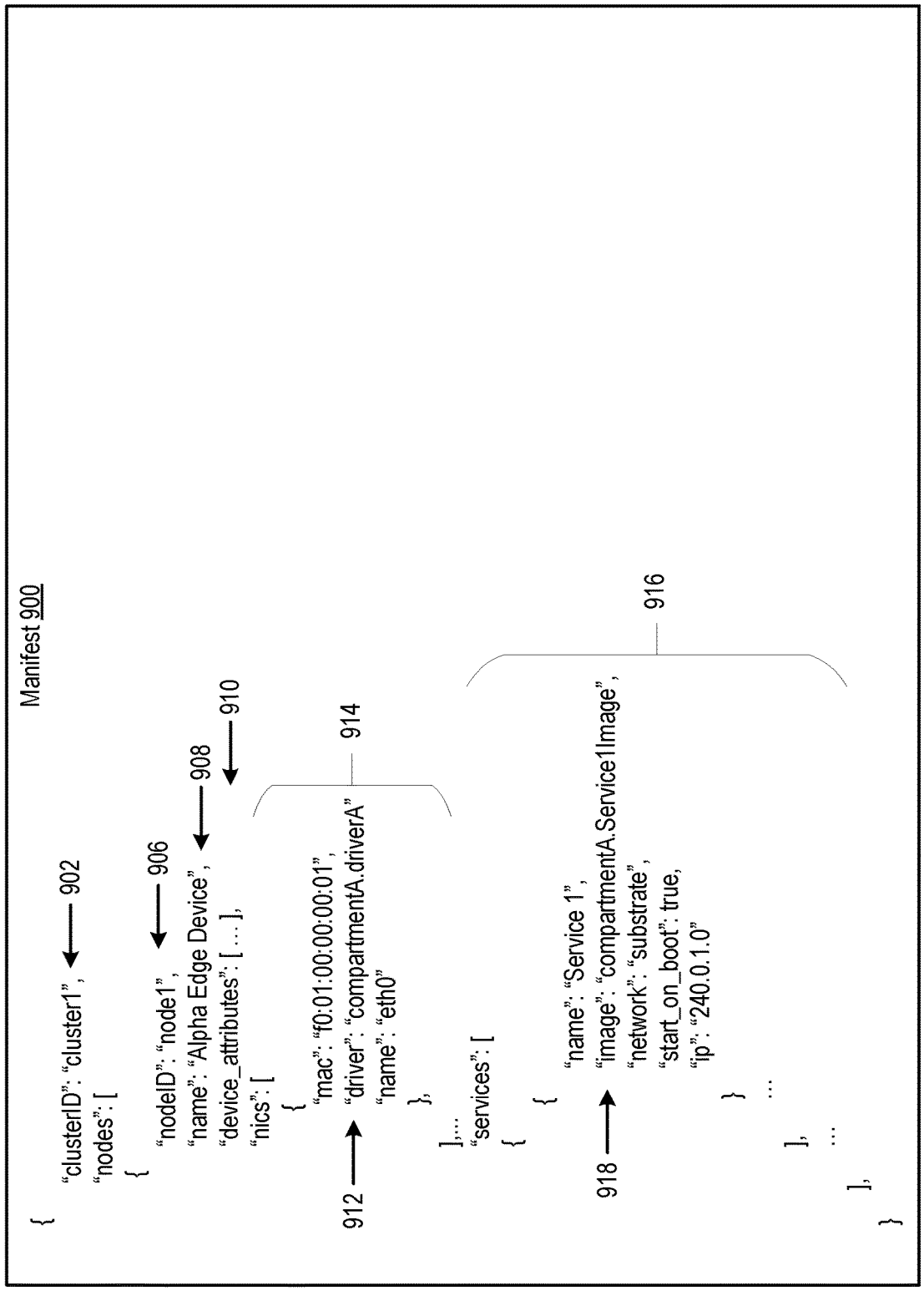
FIG. 9 is a block diagram depicting an example manifest, in accordance with at least one embodiment.

FIG. 9 is a block diagram depicting an example manifest 900 (an example of the manifest 818 of FIG. 8), in accordance with at least one embodiment. The manifest 900 may include any suitable number of attributes corresponding to a group of one or more edge devices. By way of example, a cluster identifier (e.g., attribute 902) is depicted in FIG. 9. Section 904 is intended to depict configuration data corresponding to one edge device. In some embodiments, a node may be assigned an identifier and/or a name as depicted at 906 and 908, respectively. The manifest 900 may indicate a set of device attributes for a given node (e.g., a particular edge device) at 910.

A manifest may include any suitable information pertaining to one or more network interface cards. A network interface card may be defined as having a media access control (MAC) address or another suitable identifier such as a name. In some embodiments the manifest 900 may identify (e.g., using attribute 912 or the like) a location from which a driver for a network interface card may be obtained. This information, among other things, may be included within section 914. Section 914 may include any suitable number of NIC definitions. In some embodiments, attribute 912 may identify a compartment (or other suitable container), a file name (e.g., "driverA"), a tenancy, or any suitable information with which a storage location and/or identity of a resource (e.g., an object, an object bucket, a container, a storage location, a file, an image, etc.) may be ascertained.

A manifest may identify any suitable number of services. Manifest 900 depicts at least one service. Within the manifest, various service level attributes may be identified. By way of example, section 916 may include a name for the service, a location at which the image for the service can be found and/or a file name or file path for the image, a default network name within which the service will operate, an indicator indicating whether the service will start on boot, and an IP address for the service. The manifest 900 may include any suitable number of services within section 916. Attribute 918 may identify a compartment (or other suitable container), a file name (e.g., "Service1Image"), a tenancy, or any suitable information with which a storage location and/or identity of a resource (e.g., an object, an object bucket, a container, a storage location, a file, an image, etc.) may be ascertained.

Although the manifest 900 is depicted as including certain attributes of a cluster, a node, or a device, it should be appreciated that a manifest may identify any suitable attribute of a cluster, node, or a device (e.g., an edge device). Thus, the example attributes depicted in FIG. 9 are not intended to be considered an exhaustive list of the possible attributes that may be included in any given manifest.

Returning to FIG. 8, at 820, the service provider computer 802 may generate a list of artifacts (e.g., objects, files, images, scripts, etc.) based at least in part on the user input and execute any suitable operations collecting at least some of this data. By way of example, in some embodiments, the service provider computer 802 may collect one or more executable scripts associated with one or more portions of configuration data (e.g., a node, a service, a resource, etc.). In some embodiments, the specified storage locations may indicate particular compartments of a given tenancy of a centralized cloud-computing environment. In some embodiments, some of these artifacts may include containers of each of the set of services requested for a given edge device.

At 822, the manifest 818 may be modified to indicate configuration data (e.g., attributes/details) in accordance with the user input received at 812. By way of example, any suitable executable script collected at 820 may include an executable script that, when executed modifies a manifest file to include entries corresponding any suitable portion of the configuration data for one or more edge devices. The service provider computer 802 may be configured to execute each script. Each script may be configured to modify the manifest file to include a particular portion of configuration data. Each script may modify the manifest to include any suitable entity definition, where the entity definition defines attributes of a device, service, resource, node, etc. In some embodiments, a script may utilize any suitable portion of the received user input to modify the manifest 818. For example, a storage location specified in the user request may be utilized by a corresponding script to specify a value for a particular attribute (e.g., a storage location of a driver of a NIC card, a storage location of a virtual machine image, etc.).

At 824, the service provider computer 802 may execute a predefined rule set for assigning one or more network addresses to any suitable number of devices/entities/services identified within the manifest 818. By way of example, an IP address may be assigned to each node of the cluster (e.g., each edge device that will operate as a node in a cluster of edge devices).

In some embodiments, at 826, the service provider computer 802 may generate an Edge Device (ED) Image based at least in part on the artifacts collected at 818. In some embodiments, an ED Image may be an uber-tarball that contains the entirety of the Container and OStree on-box repositories for a given edge device.

At 828, the service provider computer 802 may be configured to collect any suitable predefined configuration files, credentials (e.g., an API key, a data volume password, a Macsec key or other suitable encryption key, etc.) agents (e.g., a netboot agent), or the like.

At 830, the service provider computer 802 (or another suitable system and/or computing device) may provision the edge device 806 (when available) by providing any suitable portion of the ED Image, manifest, configuration files, credentials, and agents to edge device 806. It should be appreciated that, in some embodiments, another service provider computer other than the one that created the manifest (e.g., a service provider computer located at a provisioning center) could execute the provisioning operations. In some embodiments, At 832, the edge device 806 may perform any suitable operations for provisioning the edge device 806 in accordance with the manifest 818. By way of example, a netboot agent executing on the edge device 806 may perform, among other things, any suitable operations related to the following: booting, partitioning, setup dmcrypt, formatting the file system. requesting an artifact URL (e.g., from the service provider computer 802), obtaining artifacts using the URL, obtaining resources using the storage locations identified in the manifest 818, committing the root file system to OStree repository, loading containers into a container repository, deploying an OStree commit, fetching remote keys and generating and/or installing local keys, installing Trenchboot and sealing an OS partition LUKS key (e.g., in a trusted platform module such as a chip, a hardware security module, an integrated circuit platform, or other hardware, firmware, and/or software for providing secure initialization of the edge device and security management of stored secrets, including encryption key(s)), and the like.

After the edge device(s) (of which edge device 806 is an example) are provisioned/configured according to the manifest 818, the cloud-computing provider may ship or otherwise deliver the edge device(s) to the customer. The edge devices now being configured in accordance with the user input provided at 812.

FIG. 10 is a schematic diagram illustrating an example user interface 1000 for designating one or more workloads to be provisioned at an edge device, in accordance with at least one embodiment. User interface 1000 may present any suitable order information corresponding to an edge device. By way of example, section 1002 displays previously provided node information, credential information, and shipping information. At least some of the data presented in section 1002 may be received via user input (e.g., via one or more messages as described at 812 of FIG. 8). Any suitable portion of the node information, credential information, and/or shipping information may be provided via user interface 1000 or another suitable interface from which user interface 1000 is accessible.

In some embodiments, user interface 1002 may include section 1004. Section 1004 is configured to present any suitable data corresponding to any suitable number of workloads (e.g., resources to be provisioned at the edge device corresponding to the data provided in section 1002). Initially (e.g., by default), section 1004 may not include entries 1006. In some embodiments, a user may access a user interface for specifying attributes of a workload to be provisioned at the edge device corresponding to the data provided in section 1002 (referred to as "the selected edge device"). By way of example, a user interface element (e.g., button 1008) to navigate to or otherwise display a user interface for specifying workload attributes.

By way of example, FIG. 11 is a schematic diagram illustrating an example user interface (e.g., user interface 1100) for specifying attributes of a workload to be provisioned at an edge device, in accordance with at least one embodiment. User interface 1100 may include any suitable number of user interface elements (e.g., text boxes, drop down menus, check mark boxes, radio buttons, etc.) configured to obtain any suitable number of workload attributes.

As depicted, user interface 1100 may include user interface (UI) element 1102. In this example, UI element 1102 is a drop down menu from which an attribute corresponding to a workload type (e.g., indicating the resource is a bucket, an image, an object, etc.) may be selected. In some embodiments, the UI element 1102 may be selected to present any suitable number of type values (e.g., a value corresponding to a bucket or other storage location or container, an image, a file, an object, etc.). In some embodiments, selecting a value using UI element 1102 may cause the UI element 1104 to be modified to indicate texting corresponding to the value provided at UI 1102. By way of example, selecting a value type of "Bucket" via UI element 1102 may cause the text "Select a Bucket" to be presented within UI element 1104. As another example, if the value type of "Image" was selected via the UI element 1102, the text "Select an Image" may be presented within UI element 1104.

User interface 1100 may present additional storage location information such as a compartment, tenancy, container, or the like. As depicted, the user interface 1100 presents storage location information 1106 corresponding to a compartment (e.g., "compartmentA"). In some embodiments, the value (e.g., "compartmentA") may be set by default (e.g., according to previously identified user-defined preferences, according to a previously identified value (e.g., the compartment name provided as part of the entry of the node information presented at 1002 of FIG. 10, or the like). In some embodiments, no storage location value may be initially presented. At any suitable time, the user may select UI element 1108 to change the value of the storage location information 1106. Upon selection, a list of possible storage locations from which a value may be selected may be presented via the user interface 1100 or another suitable user interface.

Upon selecting a particular value, the storage location information 1106 may be updated to the selected value. In some embodiments, the UI element 1104 may not be enabled for user modification until values are provided at UI element 1104 and for storage location information 1106. Once enabled, the UI element 1104 may be configured to present only resources that correspond to the values provided at UI element 1102 and in storage location information 1106 (e.g., only buckets located in compartmentA).

User interface 1100 may include any suitable user interface elements corresponding to any suitable workload attributes. As depicted in FIG. 11, user interface 1100 may include UI elements 1110 with which a number of additional workload attributes may be provided. The user may submit a user request to attach a workload (e.g., to provision the edge device corresponding to the information presented at 1002 of FIG. 10) based at least in part on selecting UI element 1112, or a similar user interface element. In some embodiments, upon selecting UI element 1112, the user may be returned to viewing user interface 1000 of FIG. 10.

Figure 12:
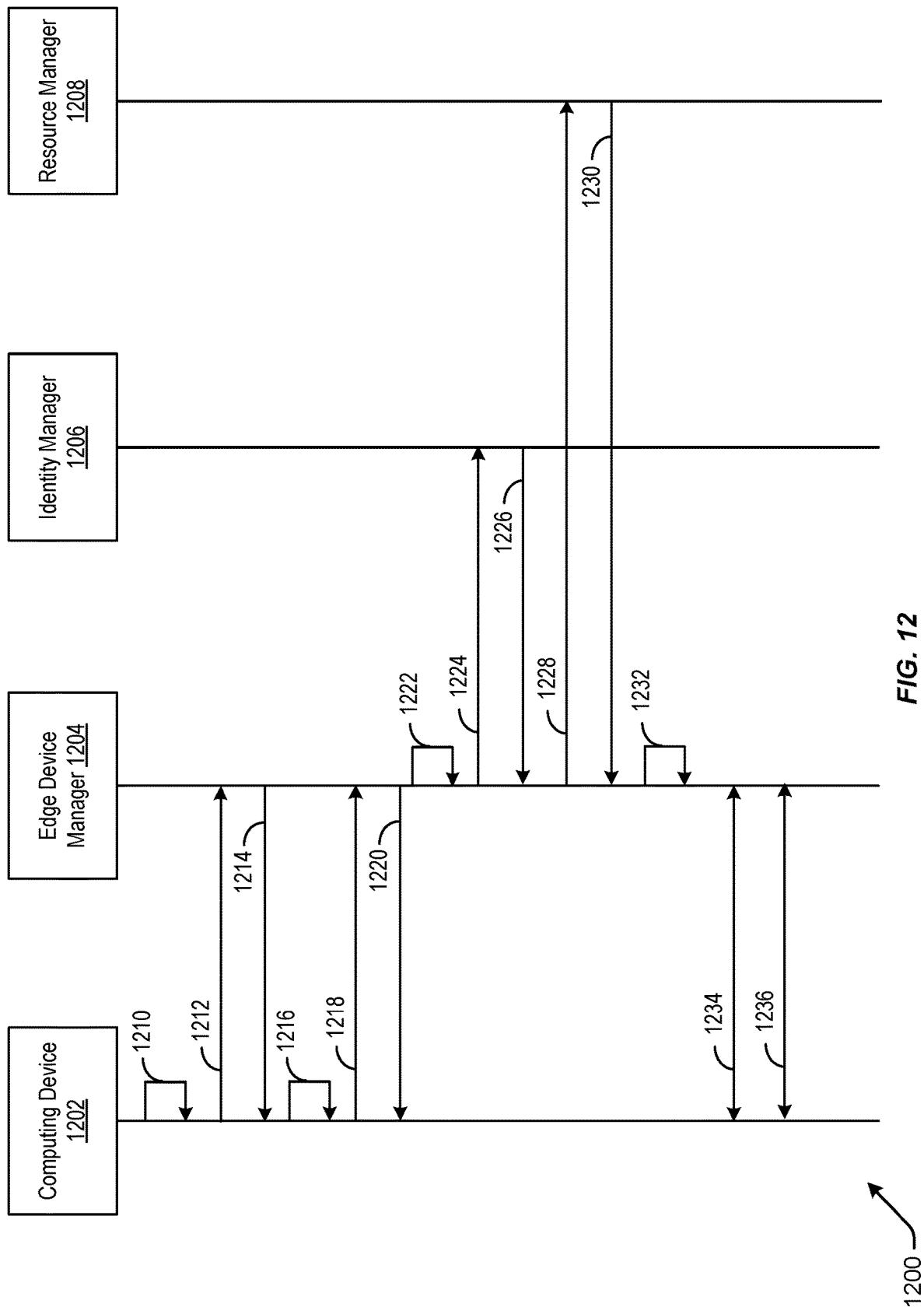
FIG. 12 is a block diagram illustrating a flow for validating access of one or more edge devices to centralized cloud computing environment resources, according to at least one embodiment.

FIG. 12 is a block diagram illustrating a method 1200 for validating access of one or more edge devices to centralized cloud-computing environment resources, according to at least one embodiment. Method 1200 may be performed with a computing device (e.g., computing device 1202, an example of user device 804 of FIG. 8) and an edge device manager 1204 (e.g., a computing component operating at the service provider computer 802 of FIG. 8), an identity manager 1206, and a resource manager 1208. The edge device manager 1204 may be a computing module, service, system, or device, configured to manage the provisioning of one or more edge devices and/or the generation of one or more manifests for provisioning one or more edge devices. The identity manager 1206 may be a computing module, service, system, or device, configured to validate the identity of users and/or devices (e.g., one or more edge devices) based at least in part on one or more credentials. In some embodiments, the identity manager 1206 may store and/or manage one or more access control policies related to various users and/or groups (e.g., user groups, device groups, etc.) to one or more resources (e.g., compartments, buckets, files, objects, images, etc.). The resource manager 1208 may be a computing module, service, system, or device, configured to manage one or more resources or the resource manager 1208 may be the resource itself (e.g., an object, object storage bucket, file location, file, image, etc.). In some embodiments, at least one of: the edge device manager 1204, identity manager 1206, and/or resource manager 1208, is a service operating in the centralized cloud-computing environment.

Method 1200 may begin at 1210, where edge device order information (e.g., node information, shipping information, payment information, credential information) may be entered at the computing device via one or more user interfaces. The information entered at 1210 may include, but is not limited to, any suitable corresponding to the data presented at section 1002 of FIG. 10.

At 1212, the edge device order information requesting one or more edge devices may be transmitted in a device request to edge device manager 1204 via one or more messages over a network (e.g., a private network or a public network such as the Internet). In some embodiments, a tenancy identifier that identifies a tenancy associated with the user may be obtained and provided as part of the data transmitted at 1212. In some embodiments, the edge device manager 1204 may be configured to generate a unique identifier for edge device corresponding to the device request. The device request could include edge device order information for multiple devices. If so, the edge device manager 1204 may generate a unique identifier for each edge device requested. In some embodiments, the edge device manager 1204 may generate the identifier(s) according to a predefined scheme and/or using any suitable portion of data provided in the user request (e.g., a name of the node/edge device as designated in the user input provided in the request). Although not depicted, in some embodiments, the edge device manager 1204 may register, enroll, or store the identifier based at least in part on providing the identity manager 1206. In some embodiments, the identifier may be deleted, or the generation of the identifier may be determined to fail, if the identity manager 1206 does not access the registration, enrollment, or storage of the identifier as requested by the edge device manager 1204. In some embodiments, the edge device manager 1204 requests generation of the identifier from the identity manager 1206 and the identity manager 1206 is configured to generate the identifier for the edge device, maintain a record of that identifier, and provide the identifier to the edge device manager 1206.

At 1214, the edge device manager 1204 may transmit a response to the device request to the computing device 1202. The response may include any suitable data indicating the request has been received. In some embodiments, the response may include the generated identifier and/or a status indicating the success or failure of generating the identifier. If the edge device manager 1204 was unable to generate (or register/enroll/store the identifier), the response may indicate that the request has failed. Based at least in part on the response data, the user interface (e.g., user interface 1000) may be updated to indicate a status of the request. By way of example, the status (also referred to as details) may indicate the order has been accepted, that the order is pending approval, that the order is in progress, that device provisioning has commenced, that device provisioning has concluded, that shipment is pending or occurred, or the like. An example of once such status is depicted in section 1002 of FIG. 10.

At 1216, any suitable number of workload attributes may be obtained via a user interface (e.g., the user interface 1100 of FIG. 11). The workload attributes may be obtained via user selection (e.g., selection of UI element 1008 of FIG. 10) and/or user input (e.g., user input provided via UI 1100).

These workload attributes may be transmitted at 1218 in a request (referred to herein as a "workload request" or "resource request") to the edge device manager 1204. The request may include any suitable data. For example, the request may include the identifier provided for the edge device at 1214, a tenancy identifier corresponding to a tenancy associated with the user, a compartment identifier corresponding to a compartment in which the resource is located, and the like.

At 1220, in response to receiving workload attributes via the request transmitted at 1218, the edge device manager 1204 may transmit any suitable information for updating a status at the user interface from which the workload request was initiated. By way of example, the data transmitted at 1218 may update the status of an entry of section 1004 of FIG. 4 (e.g., entry 1010) with a status indicating that validation is commencing, the request is in progress, etc. As a non-limiting example, the status may indicate the request is "In progress."

At 1222, the edge device manager 1204 may be configured to generate a credential for the requested edge device. If multiple edge devices were indicated in the request received at 1218 (indicating the workload/resource is to be provisioned at multiple edge devices), the edge device manager 1204 may be configured to generate a credential for each edge device. In some embodiments, the credential is ephemeral. That is, the edge device manager 1204 may generate the credential to validate access to the requested workload(s)/resource(s) on behalf of the specified edge device(s). The edge device manager 1204 may store the credential as being associated with any suitable portion of the information transmitted at 1216 (e.g., the edge device's unique identifier, a compartment identifier, a tenancy identifier, etc.). After the resource is determined to be accessible/inaccessible to the edge device(s)), the edge device manager 1204 may delete the credential(s) at any suitable time. In some embodiments, the credential may include a public/private key pair (e.g., an RSA key pair). The public/private key pair may be used to generate digital signatures and verify those signatures. In some embodiments, requests from an edge device (or another computing component such as the edge device manager 1204 when sending a request on behalf of an edge device) may be digitally signed using the private key of the key pair. The public key may be previously provided to any suitable component (e.g., the identity manager 1206, the resource manager 1208, etc.) and may be used along with the digital signature to validate that the request is authentic and unaltered.

At 1224, the edge device manager 1204 may submit a request for a token from the identity manager 1206. In some embodiments, a token may be required to request data from any suitable resource manager (e.g., resource manager 1208). In some embodiments, the token (e.g., a resource provider session token indicates that the requesting entity utilizing the token has been verified by the identity manager 1206. In some embodiments, the submitted request may constitute a request to enroll and/or register the public/private key pair generated for the edge device(s) by the edge device manager 1204. In some embodiments, the request may include any suitable data such as the unique identifier for the edge device generated by the edge device manager 1204 and provided at 1214, a compartment or other storage location identifier, a tenancy identifier, or the like. Upon receiving the request, the identity manager 1206 may determine whether any preexisting access control policies exist for the edge device and/or an access group to which the edge device belongs (e.g., based on identifying an attribute of the edge device matches an attribute associated with the access group). In some embodiments, if the edge device is not associated with any access control policies and/or no access control policies can be applied to the edge device, the identity manager 1206 may transmit data to the edge device manager 1204 indicating that the requested resource(s) are inaccessible to the edge device(s). If the requested resources are accessible to the edge device, the identify manager 1206 may generate and store a token as being associated with any suitable portion of the information received at 1224 (e.g., the edge device's unique identifier, a compartment identifier, a tenancy identifier, etc.).

At 1226, the identity manager 1206 may transmit the token it generated back to the edge device manager 1204.

At 1228, the edge device manager 1204 may execute operations for requesting access to a resource. By way of example, the edge device manager 1204 may execute a function call or application programming interface request to attempt to access the requested resource(s). As a non-limiting example, the edge device manager 1204 may an HTTP GET request that includes any suitable portion of the edge device information (e.g., the edge device's unique identifier, a compartment identifier, a tenancy identifier, etc.), the token obtained at 1226, and/or any suitable combination of the workload attributes (e.g., a storage bucket identifier, a container identifier, a file name, a file path, an image, etc.). In some embodiments, the resource manager 1208 may be configured to validate the token (e.g., with the identity manager 1206) before providing access to the requested resource. In some embodiments, the resource manager 1208 may allow access to the edge device in accordance with at least one access control policy maintained by the identity manager 1206 for the edge device or group to which the edge device belongs.

At 1230, the resource manager 1208 may transmit a response including status information indicating a status with respect to validating access for one or more edge devices to one or more resources. For example, the response can indicate that the edge device(s) have, or do not have, access to the requested resource. The edge device manager 1204 may store this status information at 1232.

At 1234, the computing device 1202 may fetch status information for the request from the edge device manager 1204 or otherwise receive a response to the request. The status information may indicate that the request was successful or unsuccessful and may be presented at any suitable user interface in any suitable manner. In some embodiments, receipt alone of the response may be used by the edge device manager 1204 as an indication that the resource is accessible to the edge device. A status indicator may be presented at the interface hosted by the edge device manager 1204 (e.g., UI 1000, at 1012 of FIG. 10). In some embodiments, the operations performed at 1216 to 1234 may be performed any suitable number of times according to any suitable number of requests and/or resources to which access is being validated. In some embodiments, the edge device manager 1204 may be configured to retry any suitable operations (e.g., the operations performed with respect to 1224) if a response has not been received after a predefined threshold period of time. The number of retries may be limited to a predefined number (e.g., 1, 2, etc.).

At 1236, a user may select an option to submit an edge device request. In some embodiments, this option may not become enabled for selection until all access to all requested workloads/resources has been validated.

Returning to FIG. 10, upon making selections via user interface 1100 (or another suitable interface), corresponding workload/resource data may be presented via entry 1010 in accordance with the method 1200 discussed in connection with FIG. 12. In some embodiments, this data may include any suitable attribute (e.g., name, type, compartment/storage location, any suitable attribute of a resource/workload, etc.) provided at user interface 1100 and/or any suitable attribute derived from that information (e.g., size, etc.). In some embodiments, a status may be presented at 1012 that indicates a status of validating access to the workload/resource. The status may among other things, indicate whether the workload/resource is accessible to the selected edge device. By way of example, the status may include "Succeeded" when the workload/resource is determined to be accessible to the selected edge device and "Failed" otherwise, although other values may be used (e.g., granted/denied, allowed/denied, accessible/inaccessible, etc.). In some embodiments, the status may initially indicate validation is being executed (e.g., "In progress").

Entry 1014 is intended to depict a subsequent user request (e.g., a workload attach request corresponding to a resource "ImageB"). As depicted, the status of validating access provided at 1016 indicates the workload/resource is inaccessible to the selected edge device. In some embodiments, if the resources requested (e.g., ImageB) were determined to be inaccessible to the edge device (e.g., no access control policy existed enabling access for the edge device or a group to which the edge device belongs, or a response was not received from the resource) a status indicating the validation failed may be presented at 1016. This is merely an example, any suitable status indicator may be used.

In some embodiments, in response to determining a given request has failed, the user interface 1000 may be updated (e.g., by the edge device manager 1204 of FIG. 12) to include a UI element 1018 corresponding to an option to rectify the failure and/or to add one or more access control policies for the edge device(s). Selecting the UI element 1018 may cause the user interface 1300 of FIG. 13 to be presented.

Figure 13:
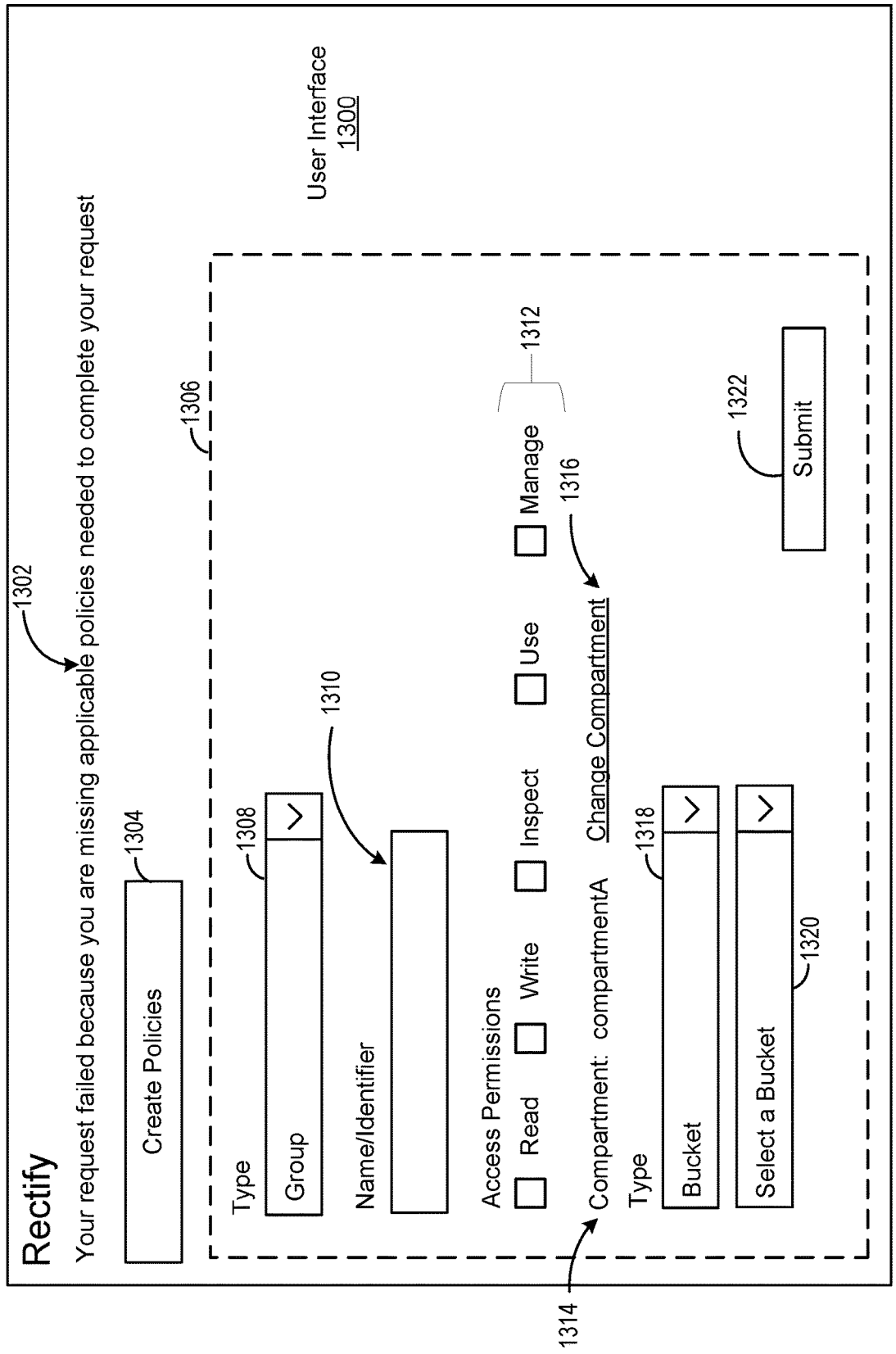
FIG. 13 is a schematic diagram illustrating an example user interface for creating a policy to enable access to a workload by one or more edge devices, in accordance with at least one embodiment.

FIG. 13 is a schematic diagram illustrating an example user interface 1300 for creating a policy (e.g., an access control policy) to enable access to a workload by one or more edge devices, in accordance with at least one embodiment. The user interface 1300 may be presented based at least in part in response to detecting a selection of the UI element 1018 of FIG. 10. In some embodiments, the user interface 1300 may initially present any suitable information related to a validation failure associated with one or more workload requests. By way of example, the user interface 1300 may present text 1302 indicating that a previous workload request (e.g., corresponding to entry 1014 of FIG. 10) failed due to the user missing applicable policies (e.g., access control policies) needed to complete the request and/or access the requested workload/resource.

In some embodiments, a user interface element (e.g., UI element 1304) may be provided at user interface 1300. The UI element 1304 may be related to an option to create one or more access control policies with which the failure described at 1302 may be rectified. In some embodiments, upon selecting UI element 1304, UI elements 1306 may become visible at user interface 1300. In other embodiments, UI element 1304 may not be included in the user interface 1300 and UI elements 1306 may be visible from the onset.

UI elements 1306 may include any suitable number or type of interface element (e.g., text boxes, drop down menus, check boxes, radio buttons, and the like) that may be utilized to obtain access control policy data. Access control policy data may include any suitable combination of data including, but not limited to, a policy type (e.g., individual device, device group, etc.), a policy name and/or identifier, access permissions (e.g., read permission, write permission, inspect permission, use permission, and/or manage permission), a compartment and/or tenancy identifier, a resource type, a resource identifier, and the like. The user may utilize UI element 1308 to select a policy type. In some embodiments, the UI element 1308 is a drop down menu that enables selection of either a policy corresponding to a single device (e.g., device) or a policy corresponding to a group (e.g., a device group). In some embodiments, UI element 1310 may be utilized to provide a name and/or identifier to which the policy relates. As a non-limiting example, the identifier generated and provided by the edge device manager 1204 at 1214 may be prepopulated or entered via UI element 1310. As another example, if a group type is selected via UI element 1308, the data provided using UI element 1310 may include any suitable number of expressions that may be matched to any suitable number of device attributes of any suitable number of devices. By way of example, the text "resource.type='EdgeDeviceNode'" may be utilized as an expression that identifies a value (e.g., "EdgeDeviceNode") that may be matched to attributes (e.g., resource.type attributes) of known devices. Any suitable number of expressions may be provided using UI element 1310.

UI elements 1312 may be utilized to identify one or more types of access permissions (e.g., read, write, inspect, use, manage, etc.) to be granted to the device/group designated using the data provided via UI elements 1308 and 1310.

User interface 1300 may present storage location information such as a compartment, tenancy, container, or the like. As depicted, the user interface 1300 presents storage location information 1314 corresponding to a compartment (e.g., "compartmentA"). In some embodiments, the value(s) for the storage location information (e.g., "compartmentA") may be set by default according to previously identified user-defined preferences, according to a previously identified value (e.g., the compartment name provided as part of the entry of the node information presented at 1002 of FIG. 10, the compartment name selected via user interface 1100 with respect to a corresponding workload request, etc.), or the like. In some embodiments, no storage location information may be initially presented. At any suitable time, the user may select UI element 1316 to change the value of the storage location information 1314. Upon selection, a list of possible storage locations (e.g., tenancy, compartments, etc.) from which a value may be selected may be presented via the user interface 1300 or another suitable user interface. Upon selecting a particular value, the storage location information 1314 may be updated to the selected value.

As depicted in FIG. 13, user interface 1300 may include UI element 1318. In this example, UI element 1318 is a drop-down menu from which an attribute corresponding to a workload/resource type (e.g., indicating the resource is a bucket, an image, an object, etc.) may be selected. In some embodiments, the UI element 1318 may be selected to present any suitable number of type values (e.g., a value corresponding to a storage bucket or other storage location or container, an image, a file, an object, etc.). In some embodiments, selecting a value using UI element 1318 may cause the UI element 1320 to be modified to indicate texting corresponding to the value provided at UI element 1318. By way of example, selecting a value type of "Bucket" via UI element 1318 may cause the text "Select a Bucket" to be presented within UI element 1120. As another example, if the value type of "Image" was selected via the UI element 1318, the text "Select an Image" may be presented within UI element 1320.

UI element 1322 may be enabled when all required data has been entered via the other UI elements 1306. Upon selecting UI element 1322, the user input entered via the UI elements 1306 may be transmitted to the identity manager 1206 via the edge device manager 1204. The identity manager 1206 may be configured to generate and store the access control policy in a data store for subsequent use. Once generated, the identity manager 1206 may transmit a response that causes the edge device manager 1204 to update the UI interface with a set of one or more successfully generated access control policies. By way of example, an entry (e.g., "Allow group EdgeDeviceGroup to manage object-family in tenancy," "Allow group EdgeDeviceGroup to read object-family in compartmentA," etc.) may be listed that indicates that an access control policy exists.

In some embodiments, user interface 1300 may be used to suggest a particular policy to the user. By way of example, using an attribute of the edge device (e.g., a name (e.g., "Alpha Edge Device", an identifier (e.g., "node1"), a device type (e.g., "edge device") such as those corresponding to the device attributes shown in section 1002 of FIG. 10) and any suitable portion of the workload/resource attributes provided via user interface 1100 of FIG. 11, the edge device manager 1204 may present a number of options corresponding to a group access control policy (e.g., "Allow group devices corresponding to resource.type="edge device", read access to bucketA of compartmentA") and/or an individual device access control policy (e.g., "Allow device resource.id="node1", read access to bucketA of compartmentA", Allow device resource.name="Alpha Edge Device", read access to bucketA of compartmentA", "Allow device resource.serialNo="ED5617", read and write access to bucketA of compartmentA", etc.). In some embodiments, user interface elements (e.g., check boxes, radio buttons, etc.) may be utilized to enable the user to user input indicating a selection of any of the suggested access control policies. Upon selecting the UI element 1322, the user input may be utilized to generate the selected access control policies.

In some embodiments, the failed workload request may be resubmitted automatically once the one or more access control policies have been generated. In some embodiments, selecting the UI element 1322 may cause the previously failed workload request to be resubmitted to the edge device manager 1204. The operations discussed in connection with FIG. 13 may be performed any suitable number of times based on any suitable number of validation failures identified using the method 1200 of FIG. 12.

Figure 14:
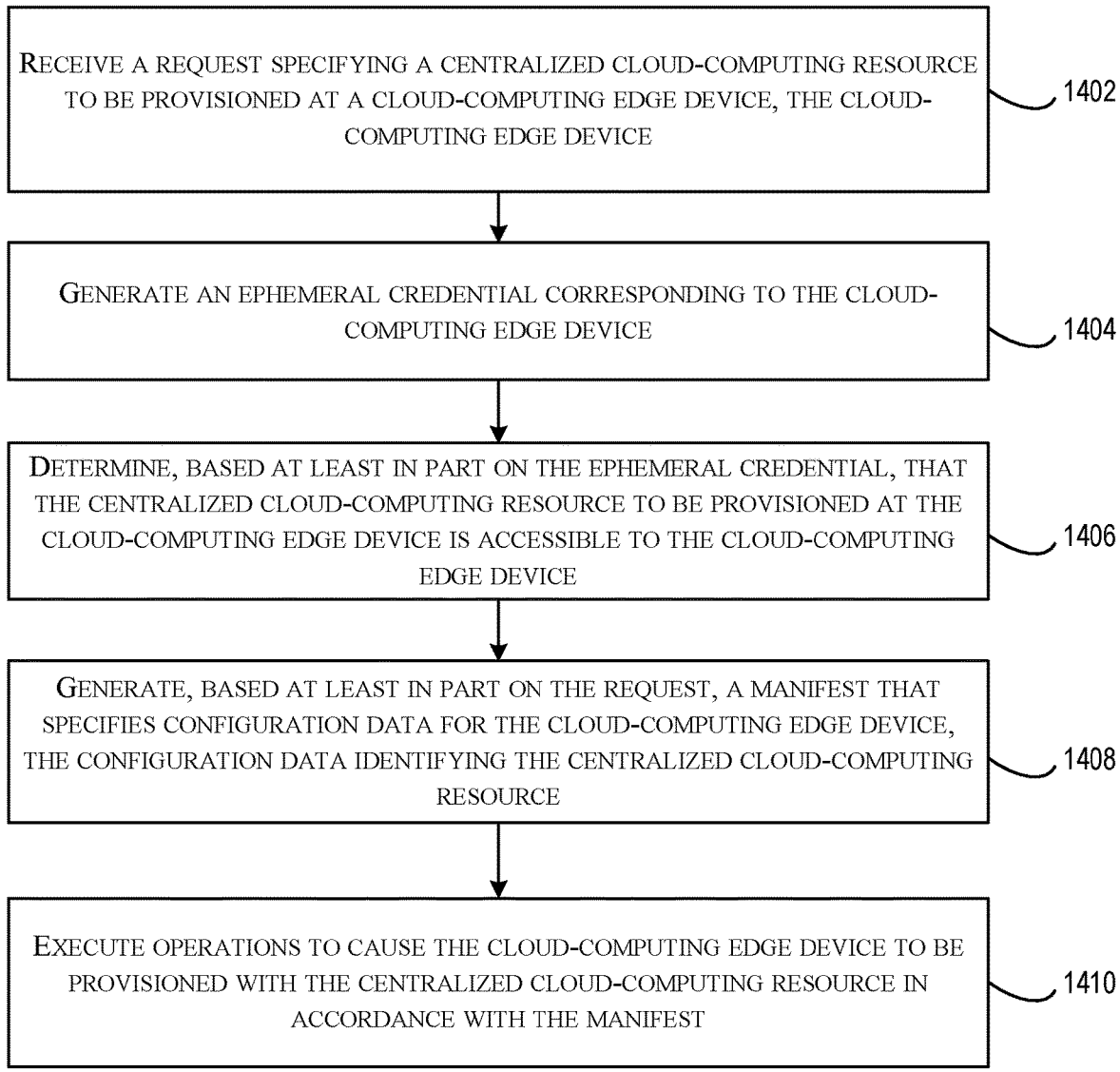
FIG. 14 is a block diagram illustrating an example method for managing a provisioning process of an edge device, in accordance with at least one embodiment.

FIG. 14 is a block diagram illustrating an example method 1400 for managing a provisioning process of an edge device, in accordance with at least one embodiment. The method 1400 may be performed by any suitable number of service provider computers (e.g., the service provider computers of FIG. 8). In some embodiments, the service provider computer(s) are operated in a cloud-computing environment by a cloud-computing provider. In some embodiments, the method 1400 may include more or fewer steps than the number depicted in FIG. 14. It should be appreciated that the steps of method 1400 may be performed in any suitable order.

The method 1400 may begin at 1402, where a request is received (e.g., a workload request as discussed at 1212 of FIG. 12). In some embodiments, the request specifies a centralized cloud-computing resource to be provisioned at a cloud-computing edge device (e.g., the edge device 806 of FIG. 8, an example of the edge devices of FIGS. 1-6. As discussed above, the cloud-computing edge device may be configured to selectively execute within an isolated computing environment separate from a centralized cloud computing environment. In some embodiments, the cloud-computing edge device has no access to a public network while executing within the isolated computing environment.

At 1404, an ephemeral credential corresponding to the cloud-computing edge device may be generated. In some embodiments, the credential may include a public/private key pair (e.g., an RSA key pair). The public/private key pair may be used to generate digital signatures and verify those signatures. In some embodiments, requests sent on behalf of an edge device may be digitally signed using the private key of the key pair. The public key may be provided to any suitable component (e.g., the identity manager 1206 of FIG. 12, the resource manager 1208 of FIG. 12, etc.) at any suitable time and may be used along with the digital signature to validate that the request is authentic and unaltered.

At 1406, it may be determined, based at least in part on the ephemeral credential, that the centralized cloud-computing resource to be provisioned at the cloud-computing edge device is accessible to the cloud-computing edge device. Determining that the cloud-computing resource is accessible to the cloud-computing edge device may utilize any suitable operations discussed above in connection with FIG. 12.

At 1408, based at least in part on determining that the centralized cloud-computing resource is accessible to the cloud-computing edge device, a manifest may be generated based at least in part on the request (e.g., using any suitable combination of the data provided in the request) that specifies configuration data for the cloud-computing edge device. In some embodiments, the configuration data identifies the centralized cloud-computing resource.

At 1408, based at least in part on generating the manifest, operations may be executed to cause the cloud-computing edge device to be provisioned with the centralized cloud-computing resource in accordance with the manifest. In some embodiments, the service provider computer may be configured to provision the edge device according to the manifest. In other embodiments, the provisioning operations may be performed by a separate computing device (e.g., a centralized cloud-computing component and/or service) based at least in part on instructions sent by the service provider computer.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a computing device operated by a cloud provider, a request specifying a requested configuration for a cloud-computing edge device that is to be configured to execute within a remote computing environment while isolated from a public network and a centralized cloud-computing environment, the requested configuration identifying a centralized cloud-computing resource to be provisioned at the cloud-computing edge device;
   performing, by the computing device, a first validation of the requested configuration by:
      generating, by the computing device, and transmitting, to a service, an access request on behalf of the cloud-computing edge device, the access request comprising an ephemeral credential that represents the cloud-computing edge device and an identifier for a compartment that is associated with the centralized cloud-computing resource;
      based on determining that the access request was denied, providing, by the computing device, a user interface associated with generating an access control policy corresponding to the cloud-computing edge device and the centralized cloud-computing resource; and
      based on input provided at the user interface, generating, by the computing device, the access control policy, and automatically performing a second validation of the requested configuration; and
   based on successful completion of the second validation, executing, by the computing device, operations that cause the cloud-computing edge device to store the requested configuration, the cloud-computing edge device comprising an agent that is configured to, upon booting, execute operations to configure the cloud-computing edge device according to the requested configuration.

2. The computer-implemented method of claim 1, wherein identifying that the centralized cloud-computing resource is inaccessible to the cloud-computing edge device comprises:
   generating, by the computing device, a public key corresponding to the cloud-computing edge device;
   transmitting, by the computing device to the service, a token request comprising a respective identifier corresponding to the cloud-computing edge device and the public key; and
   receiving, by the computing device from the service, a response to the token request, the response indicating that the centralized cloud-computing resource is inaccessible to the cloud-computing edge device.

3. The computer-implemented method of claim 1, further comprising:
   transmitting, by the computing device to the service, a token request comprising a first identifier corresponding to the cloud-computing edge device, a second identifier corresponding to the centralized cloud-computing resource, and a public key generated for the cloud-computing edge device; and
   determining, by the computing device using a token received from the service in response to the token request, that the centralized cloud-computing resource to be provisioned at the cloud-computing edge device is accessible to the cloud-computing edge device.

4. The computer-implemented method of claim 3, further comprising generating, by the computing device and based on successful completion of the second validation, a manifest that specifies configuration data for the cloud-computing edge device, the configuration data identifying the centralized cloud-computing resource, wherein the manifest that specifies the configuration data for the cloud-computing edge device is generated based at least in part on determining, using the token, that the centralized cloud-computing resource to be provisioned at the cloud-computing edge device is accessible to the cloud-computing edge device.

5. The computer-implemented method of claim 4, wherein the cloud-computing edge device is one of a plurality of cloud-computing edge devices configured to operate as a computing cluster within the isolated computing environment, and wherein the manifest specifies corresponding sets of centralized cloud-computing resources to be provisioned at each cloud-computing edge device of the plurality of cloud-computing edge devices.

6. The computer-implemented method of claim 1, further comprising:
presenting, at a second user interface, an option to submit an approval request, the option being restricted from presentation until the centralized cloud-computing resource is accessible to the cloud-computing edge device; and
receiving the approval request, wherein executing the operations to cause the cloud-computing edge device to be provisioned with the centralized cloud-computing resource is further based at least in part on receiving the approval request.

7. A cloud-computing device, comprising:
one or more processors; and
one or more memories comprising computer-executable instructions that, when executed by the one or more processors, cause the one or more processors to:
receive a request a requested configuration for a cloud-computing edge device that is to be configured to execute within a remote computing environment while isolated from a public network and a centralized cloud-computing environment, the requested configuration identifying a centralized cloud-computing resource to be accessed by the cloud-computing edge device;
perform a first validation of the requested configuration by causing the one or more processors to:
generate and transmit, to a service, an access request on behalf of the cloud-computing edge device, the access request comprising an ephemeral credential that represents the cloud-computing edge device and an identifier for a compartment that is associated with the centralized cloud-computing resource;
based on determining that the access request was denied, provide a user interface associated with generating an access control policy corresponding to the cloud-computing edge device and the centralized cloud-computing resource; and
based on input provided at the user interface, generate, the access control policy, and automatically perform a second validation of the requested configuration; and
based on successful completion of the second validation, execute operations that cause the cloud-computing edge device to store the requested configuration, the cloud-computing edge device comprising an agent that is configured to, upon booting, execute operations to configure the cloud-computing edge device according to the requested configuration.

8. The cloud-computing device of claim 7, wherein executing the computer-executable instructions that identify that the centralized cloud-computing resource is inaccessible to the cloud-computing edge device further causes the one or more processors to:
generate a public key corresponding to the cloud-computing edge device;
transmit, to the service, a token request comprising a respective identifier corresponding to the cloud-computing edge device and the public key; and
receive, from the service, a response to the token request, the response indicating that the centralized cloud-computing resource is inaccessible to the cloud-computing edge device.

9. The cloud-computing device of claim 7, wherein executing the computer-executable instructions further causes the one or more processors to:
transmit, to the service, a token request comprising a first identifier corresponding to the cloud-computing edge device, a second identifier corresponding to the centralized cloud-computing resource, and a public key generated for the cloud-computing edge device; and
determine, using a token received from the service in response to the token request, that the centralized cloud-computing resource to be provisioned at the cloud-computing edge device is accessible to the cloud-computing edge device.

10. The cloud-computing device of claim 9, wherein executing the computer-executable instructions further causes the one or more processors to generate, based on successful completion of the second validation, a manifest that specifies configuration data for the cloud-computing edge device, the configuration data identifying the centralized cloud-computing resource, wherein the manifest that specifies the configuration data for the cloud-computing edge device is generated based at least in part on determining, using the token, that the centralized cloud-computing resource to be provisioned at the cloud-computing edge device is accessible to the cloud-computing edge device.

11. The cloud-computing device of claim 10, wherein the cloud-computing edge device is one of a plurality of cloud-computing edge devices configured to operate as a computing cluster within the remote computing environment, and wherein the manifest specifies corresponding sets of centralized cloud-computing resources to be provisioned at each cloud-computing edge device of the plurality of cloud-computing edge devices.

12. The cloud-computing device of claim 7, wherein executing the computer-executable instructions further causes the one or more processors to:
present, at a second user interface, an option to submit an approval request, the option being restricted from presentation until the centralized cloud-computing resource is accessible to the cloud-computing edge device; and
receive the approval request, wherein the operations that are executed to cause the cloud-computing edge device to be provisioned with the centralized cloud-computing resource are executed based at least in part on receiving the approval request.

13. A non-transitory computer-readable medium storing computer-readable instructions that, when executed by one or more processors of a cloud-computing device operated by a cloud-computing provider, causes the one or more processors to:
receive a request a requested configuration for a cloud-computing edge device that is to be configured to execute within a remote computing environment while isolated from a public network and a centralized cloud-computing environment, the requested configuration identifying a centralized cloud-computing resource to be accessed by the cloud-computing edge device;
perform a first validation of the requested configuration by causing the one or more processors to:
generate and transmit, to a service, an access request on behalf of the cloud-computing edge device, the access request comprising an ephemeral credential that represents the cloud-computing edge device and an identifier for a compartment that is associated with the centralized cloud-computing resource;

based on determining that the access request was denied, provide a user interface associated with generating an access control policy corresponding to the cloud-computing edge device and the centralized cloud-computing resource; and based on input provided at the user interface, generate, the access control policy, and automatically perform a second validation of the requested configuration; and based on successful completion of the second validation, execute operations that cause the cloud-computing edge device to store the requested configuration, the cloud-computing edge device comprising an agent that is configured to, upon booting, execute operations to configure the cloud-computing edge device according to the requested configuration.

14. The non-transitory computer-readable medium of claim 13, wherein executing the computer-readable instructions that identify that the centralized cloud-computing resource is inaccessible to the cloud-computing edge device further causes the one or more processors to:

generate a public key corresponding to the cloud-computing edge device;

transmit, to the service, a token request comprising a respective identifier corresponding to the cloud-computing edge device and the public key; and receive, from the service, a response to the token request, the response indicating that the centralized cloud-computing resource is inaccessible to the cloud-computing edge device.

15. The non-transitory computer-readable medium of claim 13, wherein executing the computer-readable instructions further causes the one or more processors to:

transmit, to the service, a token request comprising a first identifier corresponding to the cloud-computing edge device, a second identifier corresponding to the centralized cloud-computing resource, and a public key generated for the cloud-computing edge device; and determine, using a token received from the service in response to the token request, that the centralized cloud-computing resource to be provisioned at the cloud-computing edge device is accessible to the cloud-computing edge device; and generate, based on successful completion of the second validation, a manifest that specifies configuration data for the cloud-computing edge device, the configuration data identifying the centralized cloud-computing resource, wherein the manifest that specifies the configuration data for the cloud-computing edge device is generated based at least in part on determining, using the token, that the centralized cloud-computing resource to be provisioned at the cloud-computing edge device is accessible to the cloud-computing edge device.

16. The non-transitory computer-readable medium of claim 15, wherein the cloud-computing edge device is one of a plurality of cloud-computing edge devices configured to operate as a computing cluster within the remote computing environment, and wherein the manifest specifies corresponding sets of centralized cloud-computing resources to be provisioned at each cloud-computing edge device of the plurality of cloud-computing edge devices.

17. The non-transitory computer-readable medium of claim 13, wherein executing the computer-readable instructions further causes the one or more processors to:

present, at a second user interface, an option to submit an approval request, the option being restricted from presentation until the centralized cloud-computing resource is accessible to the cloud-computing edge device; and receive the approval request, wherein the operations that are executed to cause the cloud-computing edge device to be provisioned with the centralized cloud-computing resource are executed based at least in part on receiving the approval request.

18. The computer-implemented method of claim 1, wherein the user interface is prepopulated with at least one of: a device attribute of the cloud-computing edge device or an attribute of the compartment that corresponds to the centralized clous-computing resource.

* * * * *